(12) United States Patent
Hara et al.

(10) Patent No.: US 9,491,692 B2
(45) Date of Patent: Nov. 8, 2016

(54) MOBILE TERMINAL DEVICE, CONTROL METHOD, AND COMPUTER PRODUCT

(71) Applicant: FUJITSU LIMITED, Kawasaki-shi, Kanagawa (JP)

(72) Inventors: Yasushi Hara, Kunitachi (JP); Akemi Toyokura, Kawasaki (JP); Yuichi Miura, Sapporo (JP); Masao Hara, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 99 days.

(21) Appl. No.: 14/632,740

(22) Filed: Feb. 26, 2015

(65) Prior Publication Data
US 2015/0173007 A1   Jun. 18, 2015

Related U.S. Application Data

(63) Continuation of application No. PCT/JP2012/072082, filed on Aug. 30, 2012.

(51) Int. Cl.
*H04W 48/16* (2009.01)
*H04W 52/02* (2009.01)
(Continued)

(52) U.S. Cl.
CPC ......... *H04W 48/16* (2013.01); *H04W 52/0206* (2013.01); *H04W 52/027* (2013.01); *H04W 76/021* (2013.01); *H04W 88/06* (2013.01); *H04W 52/0258* (2013.01)

(58) Field of Classification Search
None
See application file for complete search history.

(56) References Cited

U.S. PATENT DOCUMENTS

| 8,259,185 B2* | 9/2012 | Kanma | H04N 1/2112 348/211.1 |
| 2004/0259546 A1* | 12/2004 | Balachandran | H04W 84/12 455/435.2 |

(Continued)

FOREIGN PATENT DOCUMENTS

| EP | 2 083 599 A2 | 7/2009 |
| JP | 2008-66781 | 3/2008 |

(Continued)

OTHER PUBLICATIONS

International Search Report mailed Sep. 25, 2012 for corresponding International Patent Application No. PCT/JP2012/072082.

(Continued)

*Primary Examiner* — Eunsook Choi
(74) *Attorney, Agent, or Firm* — Staas & Halsey LLP

(57) ABSTRACT

A mobile terminal device includes a processor that connects to a base station; connects to a network through an access point; and detects transition from a non-display state to a display state; and a storage device that stores connection history information correlating area identification information identifying a communication area of the base station, and access point identification information identifying an access point through which connection to the network has been made in the communication area. The processor, when detecting the transition in a communication area of a first base station, starts searching for an access point in the communication area of the first base station after a predetermined period elapses, and determines whether an entry including first area identification information of the first base station is retrieved from the connection history information; and after the predetermined period elapses, performs control to connect to the network, based on a determination result.

9 Claims, 26 Drawing Sheets

(51) Int. Cl.
*H04W 76/02* (2009.01)
*H04W 88/06* (2009.01)

(56) References Cited

U.S. PATENT DOCUMENTS

| | | | |
|---|---|---|---|
| 2006/0072507 A1* | 4/2006 | Chandra | H04W 36/245 370/332 |
| 2008/0176579 A1 | 7/2008 | Abdel-Kader | |
| 2009/0047946 A1* | 2/2009 | Sato | H04W 88/06 455/426.1 |
| 2009/0135798 A1* | 5/2009 | Pecen | H04W 36/245 370/338 |
| 2009/0232117 A1 | 9/2009 | Hara | |
| 2009/0247158 A1 | 10/2009 | Hara et al. | |
| 2010/0079599 A1* | 4/2010 | Kanma | H04N 1/2112 348/207.1 |
| 2010/0274913 A1* | 10/2010 | Ando | H04W 12/06 709/229 |
| 2010/0303040 A1* | 12/2010 | Takamune | H04W 48/16 370/331 |
| 2011/0273998 A1 | 11/2011 | Mudrick et al. | |
| 2011/0294504 A1 | 12/2011 | Hara et al. | |
| 2014/0140335 A1* | 5/2014 | Wang | H04W 28/08 370/338 |
| 2014/0161011 A1 | 6/2014 | Hara et al. | |
| 2014/0334446 A1* | 11/2014 | Lim | H04W 48/20 370/331 |
| 2015/0065054 A1* | 3/2015 | Jung | H04W 48/16 455/41.2 |

FOREIGN PATENT DOCUMENTS

| | | |
|---|---|---|
| JP | 2009-44659 | 2/2009 |
| JP | 2009-201104 | 9/2009 |
| JP | 2009-260951 | 11/2009 |
| JP | 2010-206435 | 9/2011 |
| JP | 2011-250342 | 12/2011 |

OTHER PUBLICATIONS

Extended European Search Report dated Aug. 11, 2015 in corresponding European Patent Application No. 12883576.6.

* cited by examiner

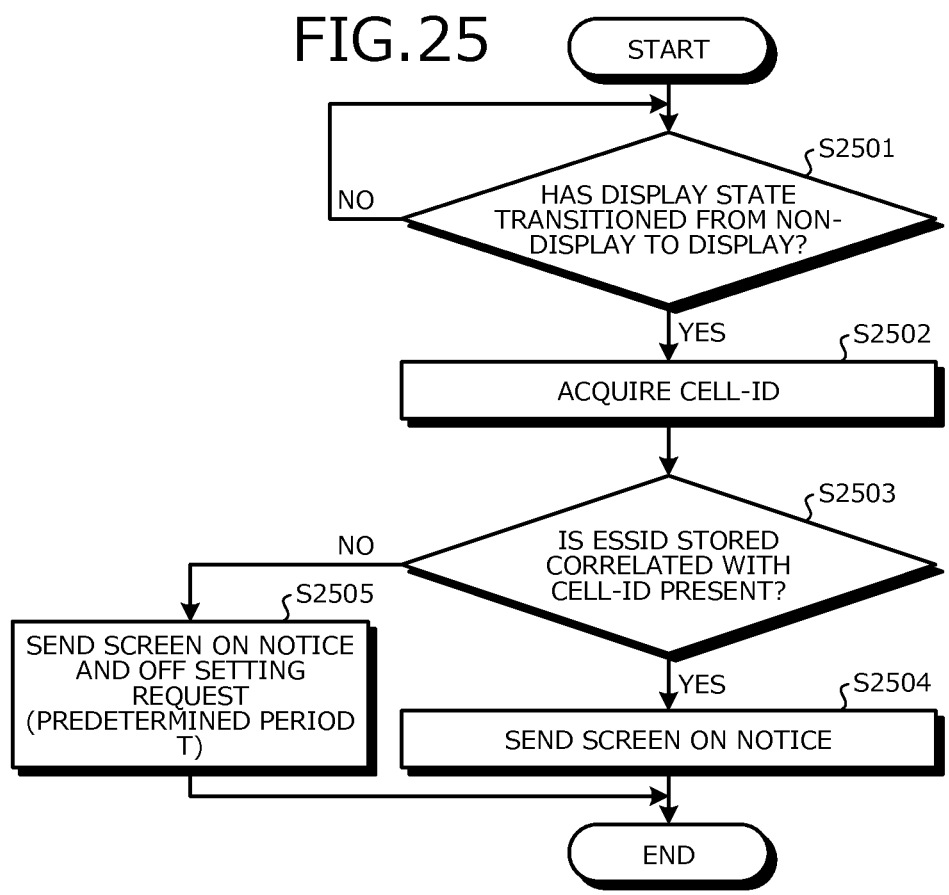

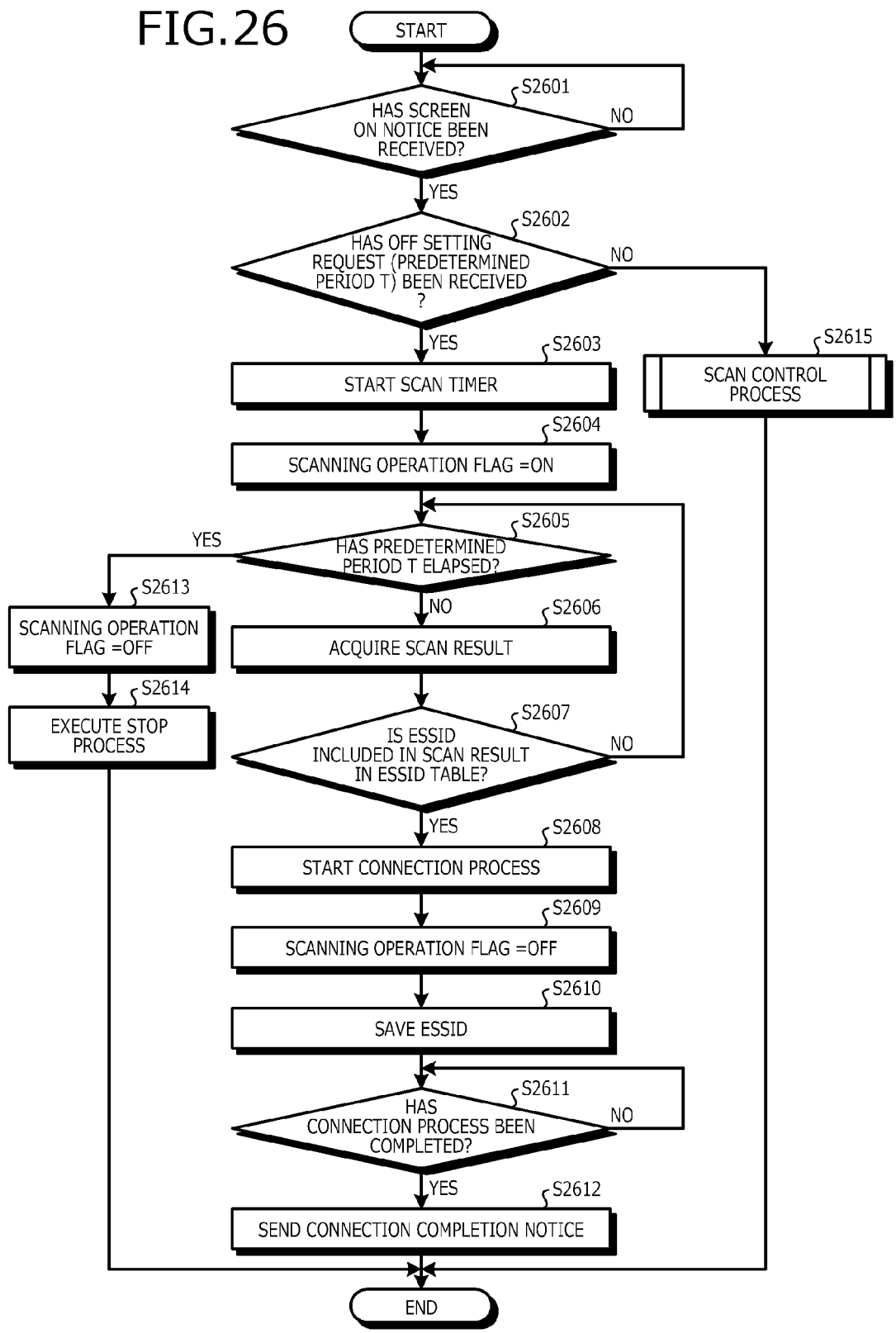

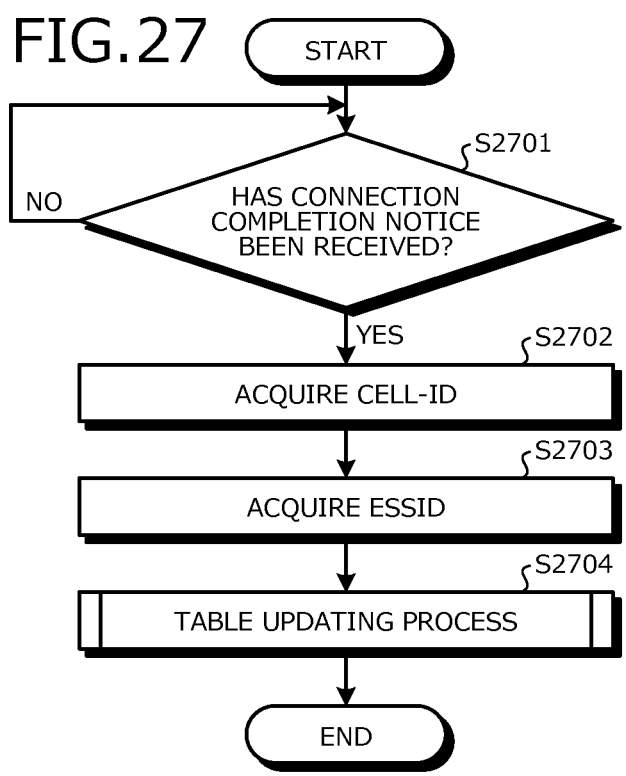

MOBILE TERMINAL DEVICE, CONTROL METHOD, AND COMPUTER PRODUCT

CROSS REFERENCE TO RELATED APPLICATIONS

This application is a continuation application of International Application PCT/JP2012/072082, filed on Aug. 30, 2012 and designating the U.S., the entire contents of which are incorporated herein by reference.

FIELD

The embodiments discussed herein are related to a mobile terminal device, a control method, and a control program.

BACKGROUND

A conventional mobile terminal device has a communication function of connecting to a mobile telephone network and a communication function of connecting to a wireless local area network (LAN). The mobile terminal device can connect to a network such as the Internet by way of, for example, base stations of the mobile telephone network and wireless LAN access points that are located at various places.

A related technique, for example, detects the position of a terminal based on the field intensity of a signal received from a mobile network base station and detects the position of a connection point to the wireless LAN based on a base station cell ID and the electric field strength of the received signal. For example, refer to Japanese Laid-open Patent Publication No. 2009-44659.

Nonetheless, with the related technique, a problem of increased the power consumption arises consequent to the mobile terminal device performing a scanning operation to search for an access point of the wireless LAN, etc. For example, in the case of starting a scanning operation to search for an access point of the wireless LAN whenever handover occurs, frequent handover leads to an increase in the power consumption of the mobile terminal device for the scanning operation to search for an access point.

SUMMARY

According to an aspect of an embodiment, A mobile terminal device includes a processor that connects to a base station; connects to a network through an access point; and detects a transition from a non-display state in which a screen is not displayed to a display state in which the screen is displayed; and a storage device that stores therein connection history information including plural entries that correlate area identification information identifying a communication area of the base station, and access point identification information identifying an access point through which a connection to the network is made in the communication area. The processor, when detecting the transition of the screen from the non-display state to the display state in a communication area of a first base station, starts searching for an access point included in the communication area of the first base station after a predetermined period elapses, and further determines whether an entry including first area identification information of the first base station is retrieved from the connection history information; and after the predetermined period elapses, performs control to connect to the network, based on a result of determination.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 25 is a flowchart of an example of a determining process procedure of the mobile terminal device 101 according to the third embodiment;

FIG. 26 is a flowchart of an example of a communication control process procedure of the mobile terminal device 101 according to the third embodiment; and FIG. 27 is a flowchart of an example of the update process procedure of the mobile terminal device 101 according to the third embodiment.

DESCRIPTION OF EMBODIMENTS

Embodiments of a mobile terminal device, a control method, and a control program will be described in detail with reference to the accompanying drawings.

Figure 1:
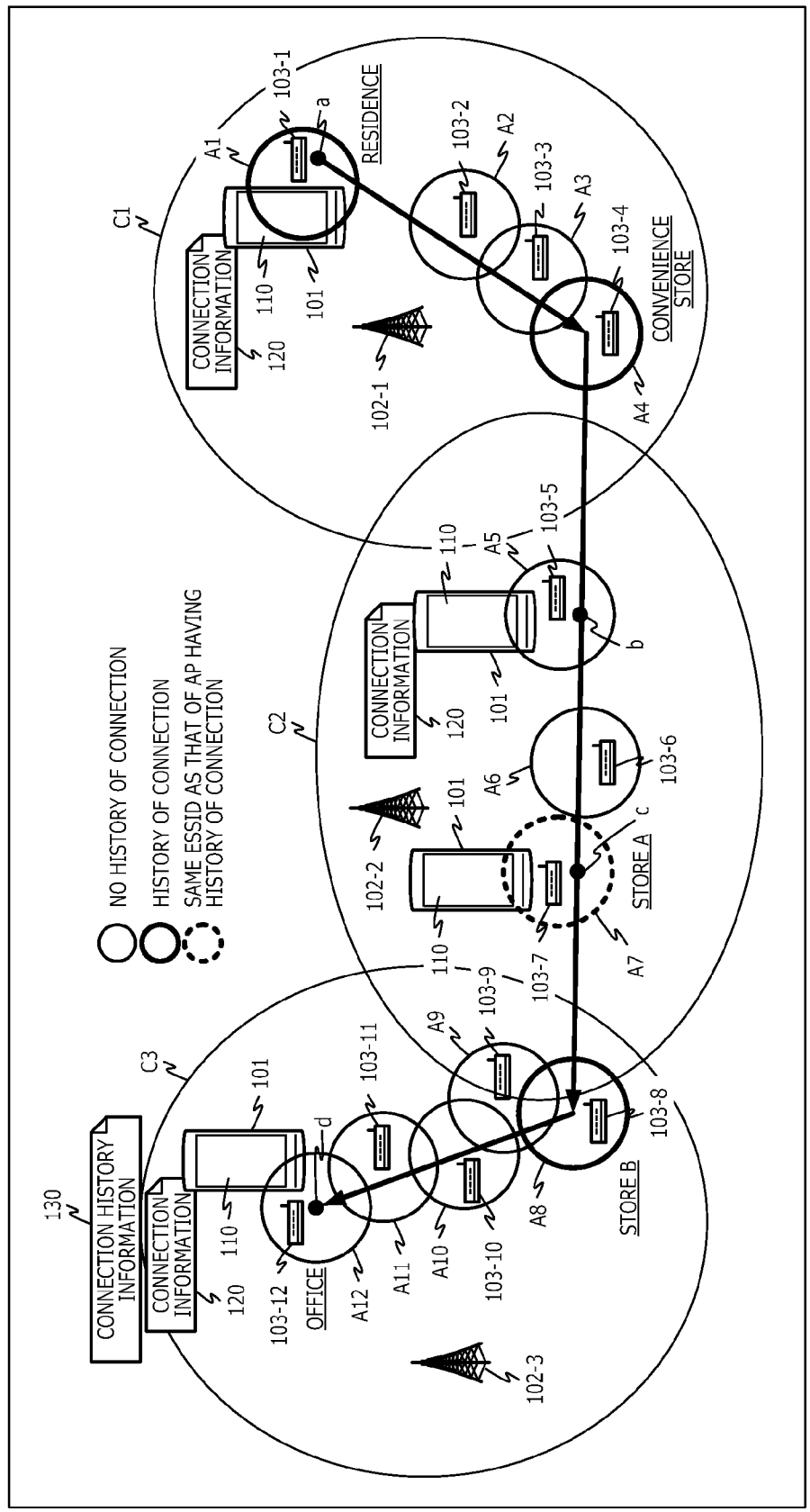
FIG. 1 is an explanatory view of an example of a control method according to a first embodiment.

FIG. 1 is an explanatory view of an example of a control method according to a first embodiment. In FIG. 1, a mobile terminal device 101 is a computer that has a screen 110, which displays various types of information, and that is capable of wireless communication with a base station 102 and an access point 103. For example, the mobile terminal device 101 is a smartphone, a mobile telephone, a tablet personal computer (PC), or a personal handy-phone system (PHS).

The base station 102 and the access point 103 are wireless stations that are capable of wireless communication with mobile terminal devices 101 located in respective communication areas, and act as, for example, bases for the mobile terminal devices 101 to connect to a network. For example, the base station 102 is one of plural base stations in a mobile communications network (mobile telephone network), interspersed at various locations. For example, the access point 103 is one of plural access points of a wireless LAN, interspersed at various locations.

The mobile terminal device 101 detects the base station 102 and access point 103 through respectively different detecting operations to enable connection to a network via the detected base station 102 and access point 103. The network includes, for example, the mobile communications network, LAN, a wide area network (WAN), Internet, etc.

As used herein, the detecting operation refers to a so-called scanning operation to search for a communicable base station 102 or access point 103 from among the base stations 102 and access points 103 interspersed at various locations. The detecting operation of detecting the base station 102 and the access point 103 differs depending on differences in the communication system, communication standards, communication performance, communication service, etc., of the wireless communication.

Thus, to detect the access point 103, the mobile terminal device 101 performs other detecting operations different from the detecting operations for detecting the base station 102. For this reason, the mobile terminal device 101 consumes electric power for the detecting operation to detect the base station 102 and consumes electric power for the detecting operation to detect the access point 103.

In the following description, an example of the base station 102 is a base station of the mobile communications network and an example of the access point 103 is an access point of a wireless LAN. A communication area of the base station 102 may be expressed as "cell C".

In the example depicted in FIG. 1, base stations 102-1 to 102-3 are depicted as the base stations 102 of the mobile communications network, while access points 103-1 to 103-12 are depicted as the access points 103 of the wireless LAN. Furthermore, cells C1 to C3 of the base stations 102-1 to 102-3 and communication areas A1 to A12 of the access points 103-1 to 103-12 are depicted.

As compared with the base station 102 of the mobile communications network, the access point 103 of the wireless LAN tends to have a narrower communication area with a higher maximum communication speed and higher transmission efficiency. Many of the access points 103 of the wireless LAN can be used only by a user that subscribes to a specific service.

If no available access point 103 is present around the mobile terminal device 101, it is undesirable for the mobile terminal device 101 to perform an operation to detect the access point 103. Although it is conceivable that, when an access point 103 is to be used, the user is to instruct the mobile terminal device 101 to start an operation to detect an access point 103; however, user input is needed and the user may not know the position where an available access point 103 is located.

Thus, in the first embodiment, the mobile terminal device 101 starts an operation to scan for the wireless LAN access point 103 in response to the transition of the screen 110 from a non-display state to a display state. If the mobile terminal device 101 does not connect to an access point 103, the mobile terminal device 101 determines after the elapse of a predetermined period T whether there is a history of connection to an access point 103 in a cell C to which the mobile device 101 belongs. If there is a history of connection to an access point 103, the mobile terminal device 101 continues the scanning operation, whereas if there is no history of connection to an access point 103, the mobile terminal device 101 stops the scanning operation.

This prevents drops in usability of the mobile terminal device 101 and suppresses the power consumed for the scanning operation for the access point 103. For example, the detecting operation of detecting the base station 102 of the mobile communications network is assumed to be performed periodically by the mobile terminal device 101. An example of a communication control process in this case by the mobile terminal device 101 according to the first embodiment will be described.

(1) The mobile terminal device 101 detects a transition from a non-display state in which the screen 110 is OFF to a display state in which the screen 110 is ON. As used herein, the non-display state (screen OFF) refers, for example, to a state in which power supply to the screen 110 is cut off. The display state (screen ON) refers, for example, to a state in which electric power is being supplied to the screen 110.

In the following description, the non-display state in which the screen 110 is OFF may be expressed as "the display state of the screen 110 is non-display", while the display state in which the screen 110 is ON may be expressed as "the display state of the screen 110 is display".

(2) If the mobile terminal device 101 detects that the display state of the screen 110 has transitioned from non-display to display in a cell C of a base station 102, the mobile terminal device 101 starts a scanning operation for an access point 103 in the cell C of the base station 102. If an access point 103 is found, the mobile terminal device 101 searches connection information 120 for an entry that includes access point identification information that identifies the found access point 103. The mobile terminal device 101 then determines whether an entry that includes access point identification information identifying the found access point 103 has been found among the connection information 120.

The connection information 120 is information that specifies access point identification information of an access point 103 through which connection to a network such as the Internet has been performed, i.e., an available access point 103. The access point identification information is for example an extended service set identifier (ESSID) or a basic service set identifier (BSSID).

The same access point identification information may be given to plural access points 103. An example of the access points 103 to which the same access point identification information is given may be for example a set of access points having the same available communication service or a set of access points that are respectively provided in stores maintained by one company. For this reason, even if the user of the mobile terminal device 101 has never used a found access point 103, access point identification information identifying the found access point 103 may be retrieved from the connection information 120.

If an entry is retrieved from the connection information 120, the mobile terminal device 101 performs an operation to connect to the found access point 103. The operation to connect to the access point 103 is a connection process for connecting to a network such as the Internet by way of the access point 103. As a result, the mobile terminal device 101 can connect to a network such as the Internet by way of the access point 103. On the other hand, if no access point 103 is found or if no entry is retrieved from the connection information 120, the mobile terminal device 101 repeats the scanning operation for the access point 103.

(3) If the mobile terminal device 101 detects that the display state of the screen 110 has transitioned from non-display to display, the mobile terminal device 101 determines after the elapse of the predetermined period T whether an entry that includes the area identification information of the base station 102 to which the mobile device 101 belongs has been retrieved from connection history information 130. The connection history information 130 includes entries associating area identification information that identifies a cell C of a base station 102 and access point identification information that identifies an access point 103 in the cell C of the base station 102 and from which connection to a network such as the Internet has been performed.

For example, the connection history information 130 is information identifying among a group of cells (e.g., cells C1 to C3) of a base station 102, a cell C in which a connecting operation to an access point 103 has been performed. The connecting operation to an access point 103 refers to an operation of connecting to a network by way of the access point 103.

Connection history to an access point 103 is history of a mobile terminal device 101 normally completing a process of connecting to the access point 103. The process of connecting to the access point 103 includes for example a user authentication process of the mobile terminal device 101. That is, as compared with a cell C having no connection history to an access point 103, a cell C having a connection history to the access point 103 is a cell with a high possibility having an access point 103 available to the user of the mobile terminal device 101.

The predetermined period T is set, for example, as a period during which plural scanning operations for an access point 103 can be performed. The predetermined period T may be a period elapsing from the transition from the non-display state to the display state of the screen 110 or a period elapsing from the start of the scanning operation for the access point 103.

For example, in the case of non-connection to an access point 103 after the elapse of the predetermined period T from the transition to display in the display state of the screen 110, the mobile terminal device 101 may search the connection history information 130 for an entry that includes area identification information of a base station 102 to which the mobile device 101 belongs. The mobile terminal device 101 then determines whether the entry including area identification information of the base station 102 to which the mobile device 101 belongs has been retrieved from the connection history information 130.

The communication area of an access point 103 indicated by a bold circle in FIG. 1 represents a communication area of an access point 103 having connection history for the mobile terminal device 101. The communication area of an access point 103 indicated by a dotted-line circle in FIG. 1 represents a communication area of an access point 103 to which is given the same access point identification information as that of an access point 103 having a connection history for the mobile terminal device 101.

(4) The mobile terminal device 101 controls the scanning operation for the access point 103, based on the result of determination of whether an entry that includes area identification information of the base station 102 has been retrieved from the connection history information 130 after the elapse of the predetermined period T.

For example, if an entry that includes area identification information of a base station 102 is retrieved from the connection history information 130 after the elapse of the predetermined period T, the mobile terminal device 101 continues the search for an access point 103 included in the cell C of the base station 102. That is, in the case of belonging to a cell C having a history of connection to an access point 103 after the elapse of the predetermined period T, the mobile terminal device 101 continues to perform the scanning operation for the access point 103.

On the other hand, if no entry that includes area identification information of a base station 102 is retrieved from the connection history information 130 after the elapse of the predetermined period T, the mobile terminal device 101 discontinues the search for an access point 103 included in the cell C of the base station 102. That is, in the case of belonging to a cell C having no history of connection to an access point 103 after the elapse of the predetermined period T, the mobile terminal device 101 stops the scanning operation for the access point 103.

Control process examples 1, 2, 3, and 4 of the mobile terminal device 101 at locations a, b, c, and d, respectively, depicted in FIG. 1 will be described by taking an example where the display state of the screen 110 transitions from non-display to display.

Control Process Example 1

First, a case is assumed in which the display state of the screen 110 transitions from non-display to display at location a at which a residence of the user of the mobile terminal device 101 is located. In this case, the mobile terminal device 101 starts the scanning operation for an access point 103 included in a cell C1 of the base station 102-1. As a result, an access point 103-1 is assumed to be found before the elapse of the predetermined period T from the transition from non-display to display in the display state of the screen 110.

The access point 103-1 is an access point 103 from which connection to a network such as the Internet has been performed. The mobile terminal device 101 therefore determines that an entry including access point identification information identifying the access point 103-1 is retrieved from the connection information 120.

If an entry is retrieved from the connection information 120, the mobile terminal device 101 performs an operation of connecting to the access point 103-1. As a result, the mobile terminal device 101 can connect to a network such as the Internet by way of the access point 103-1.

Control Process Example 2

Next, a case is assumed in which the display state of the screen 110 transitions from non-display to display at location b in the course of movement from a convenience store to a store B. In this case, the mobile terminal device 101 starts the scanning operation for an access point 103 included in a cell C2 of the base station 102-2. As a result, an access point 103-5 is assumed to be found before the elapse of the predetermined period T from the transition from non-display to display in the display state of the screen 110.

The access point 103-5 is an access point from which no connection to a network such as the Internet has been performed by the mobile terminal device 101. For this reason, the mobile terminal device 101 determines that no entry including access point identification information identifying the access point 103-5 is retrieved from the connection information 120.

If no entry is retrieved from the connection information 120, the mobile terminal device 101 does not perform the operation of connecting to the access point 103-5. In this case, the mobile terminal device 101 determines, for example, whether an entry that includes area identification information of a base station 102 to which the mobile device 101 belongs is retrieved from the connection history information 130, after the elapse of the predetermined period T from the transition from non-display to display in the display state of the screen 110.

In the example depicted in FIG. 1, no access point 103 is present having a connection history in the cell C2 of the base station 102-2. The mobile terminal device 101 therefore determines that no entry including area identification information of the base station 102-2 to which the mobile device 101 belongs is retrieved from the connection history information 130. In this case, the mobile terminal device 101 discontinues the scanning operation for the access point 103.

Control Process Example 3

Next, a case is assumed in which the display state of the screen 110 transitions from non-display to display at location c in the course of movement from the convenience store to the store B. In this case, the mobile terminal device 101 starts a scanning operation for an access point 103 included in the cell C2 of the base station 102-2. As a result, an access point 103-7 is assumed to be found before the elapse of the predetermined period T from the transition from non-display to display in the display state of the screen 110.

The access point 103-7 is provided in a store A and is an access point 103 from which no connection to a network such as the Internet has been performed by the mobile terminal device 101. The access point 103-7 has been given the same access point identification information (e.g., ESSID) as that given to an access point 103-8 provided in the store B.

The access point 103-8 is an access point 103 from which connection to a network such as the Internet has been performed. That is, the access point 103-7 is an access point 103 that has been given the same access point identification information (e.g., ESSID) as that given to the access point 103-8 from which connection to a network such as the Internet has been performed.

The mobile terminal device 101 thus determines that an entry including access point identification information identifying the access point 103-7 has been retrieved from the connection information 120. If the entry is retrieved from the connection information 120, the mobile terminal device 101 performs the operation of connecting to the access point 103-7. As a result, the mobile terminal device 101 can connect to a network such as the Internet by way of the access point 103-7.

Control Process Example 4

Next, a case is assumed in which the display state of the screen 110 transitions from non-display to display at location d at which an office of the user of the mobile terminal device 101 is located. In this case, the mobile terminal device 101 starts a scanning operation for an access point 103 included in a cell C3 of the base station 102-3. As a result, an access point 103-12 is assumed to be found before the elapse of the predetermined period T from the transition from non-display to display in the display state of the screen 110.

The access point 103-12 is an access point 103 from which connection to a network such as the Internet has not been performed by the mobile terminal device 101. The mobile terminal device 101 therefore determines that an entry including access point identification information identifying the access point 103-12 is not retrieved from the connection information 120.

If no entry is retrieved from the connection information 120, the mobile terminal device 101 does not perform the operation connecting of to the access point 103-12. In this case, the mobile terminal device 101 determines whether an entry that includes area identification information of a base station 102 to which the mobile device 101 belongs is retrieved from the connection history information 130, after the elapse of the predetermined period T from the transition from non-display to display in the display state of the screen 110 for example.

In the example depicted in FIG. 1, the access point 103-8 is depicted that has a connection history in the cell C3 of the base station 102-3. The mobile terminal device 101 therefore determines that an entry including area identification information of the base station 102-3 to which the mobile device 101 belongs has been retrieved from the connection history information 130. In this case, the mobile terminal device 101 continues to perform the scanning operation for the access point 103.

In this manner, the mobile terminal device 101 enables the scanning operation for an access point 103 included in the cell C of the base station 102 to be started when the display state of the screen 110 transitions from non-display to display. This enables an available access point 103 near the mobile terminal device 101 to be searched for in response to the screen ON, to connect to a network such as the Internet, so that usability can be ensured.

The mobile terminal device 101 enables determination of whether there is a connection history to an access point 103 in a cell C of a base station 102 to which the mobile device 101 belongs, after the elapse of the predetermined period T from the transition from non-display to display in the display state of the screen 110. The mobile terminal device 101 enables the scanning operation for the access point 103 to be continued if there is a connection history to the access point 103.

Accordingly, the scanning operation can continued to be performed in the case of belonging to a cell C with a higher possibility of having an available access point 103, as compared with a cell C having no history of connection to the access point 103, after the elapse of the predetermined period T from the screen ON. This can enhance the re-connectivity to an access point 103 and prevent drops in usability. The re-connectivity to the access point 103 represents for example the shortness of time consumed for the connection to an available access point 103.

According to the mobile terminal device 101, the scanning operation for the access point 103 can be discontinued if there is no connection history to an access point 103. Thus, the scanning operation can be discontinued in the case of belonging to a cell C with a lower possibility of having an available access point 103, as compared with a cell C having a connection history to the access point 103, after the elapse of the predetermined period T from the screen ON. By discontinuing the scanning operation when belonging to a cell C having a lower possibility of existence of an available access point 103, the power consumed for the scanning operation for the access point 103 can be suppressed while preventing drops in usability.

Even if the mobile terminal device 101 is within a communication range of an access point 103, it may be difficult for the mobile terminal device 101 to find the access point 103 by a single scanning operation. According to the mobile terminal device 101, operations to scan for an access point 103 can be executed multiple times before the elapse of the predetermined period T from the screen ON. Thus, according to the mobile terminal device 101, sufficient time for multiple executions of scanning operations can be ensured before the suspension of the scanning operations for an access point 103 started in response to the screen ON, so that the re-connectivity to the access point 103 can be enhanced.

A system configuration example of a communication system 200 according to the first embodiment will be described.

Figure 2:
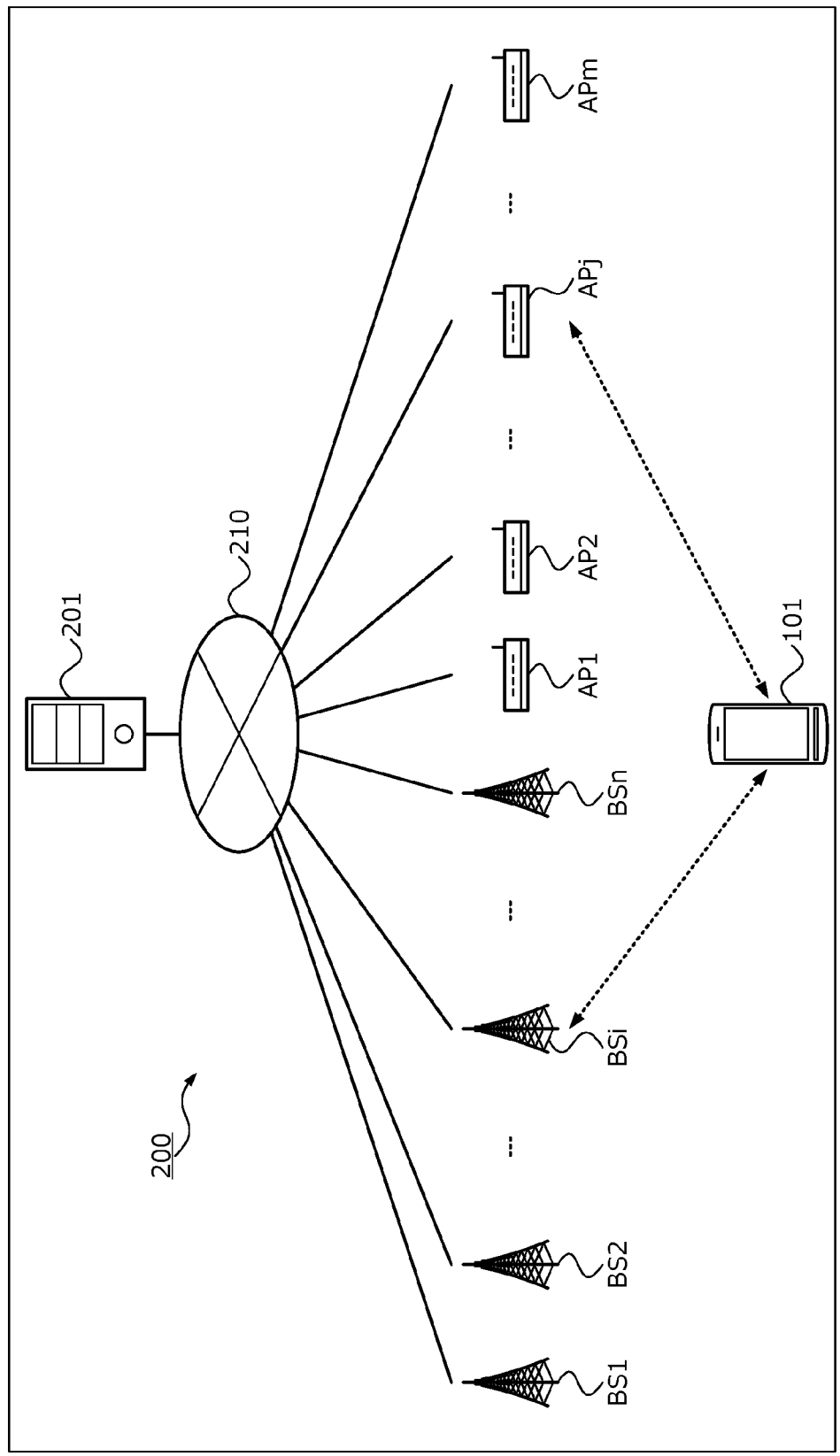
FIG. 2 is an explanatory diagram of a system configuration example of the communication system 200.

FIG. 2 is an explanatory diagram of the system configuration example of the communication system 200. In FIG. 2, the communication system 200 includes the mobile terminal device 101, base stations BS1 to BSn, access points AP1 to APm, and a server 201. In the communication system 200, the base station BS1 to BSn, the access points AP1 to APm, and the server 201 are connected to one another by way of a network 210. The network 210 includes, for example, the mobile communications network, LAN, WAN, Internet, etc.

The base stations BS1 to BSn are base stations of the mobile communications network that are interspersed at various locations. In the following description, an arbitrary base station of the base stations BS1 to BSn may be expressed as "base station BSi", while a communication area representing a communicable range of the base station BSi may be expressed as "cell Ci" (i=1, 2, . . . , n). The base station 102 depicted in FIG. 1 corresponds to the base station BSi.

The access points AP1 to APm are access points of a wireless LAN that are interspersed at various locations. The access points AP1 to APm may include a portable access point and an access point equipped on a mobile vehicle such as an electric train and a bus. In the following description, an arbitrary access point among the access points AP1 to APm may be expressed as "access point APj", while a communication area representing a communicable range of the access point APj may be expressed as "communication area Aj" (j=1, 2, . . . , n). The access point 103 depicted in FIG. 1 corresponds to the access point APj.

The mobile terminal device 101 is capable of wireless communication with a base station BSi in a cell Ci and can connect to the network 210 by way of the base station BSi. The mobile terminal device 101 is capable of wireless communication with an access point APj in a communication area Aj and can connect to the network 210 by way of the access point APj.

The server is a computer that provides a service to the mobile terminal device 101 by way of the network 210. The service is information processing provided to the mobile terminal device 101 and includes for example mail service, telephone service, and web service. For example, the server 201 includes a mail server, a web server, an application server, database server, etc.

Although FIG. 2 depicts a single mobile terminal device 101 and a single server 201, configuration is not limited hereto. For example, the mobile terminal device 101 may be disposed for each user of the communication system 200, while the server 201 may be disposed for each of the service providers.

Figure 3:
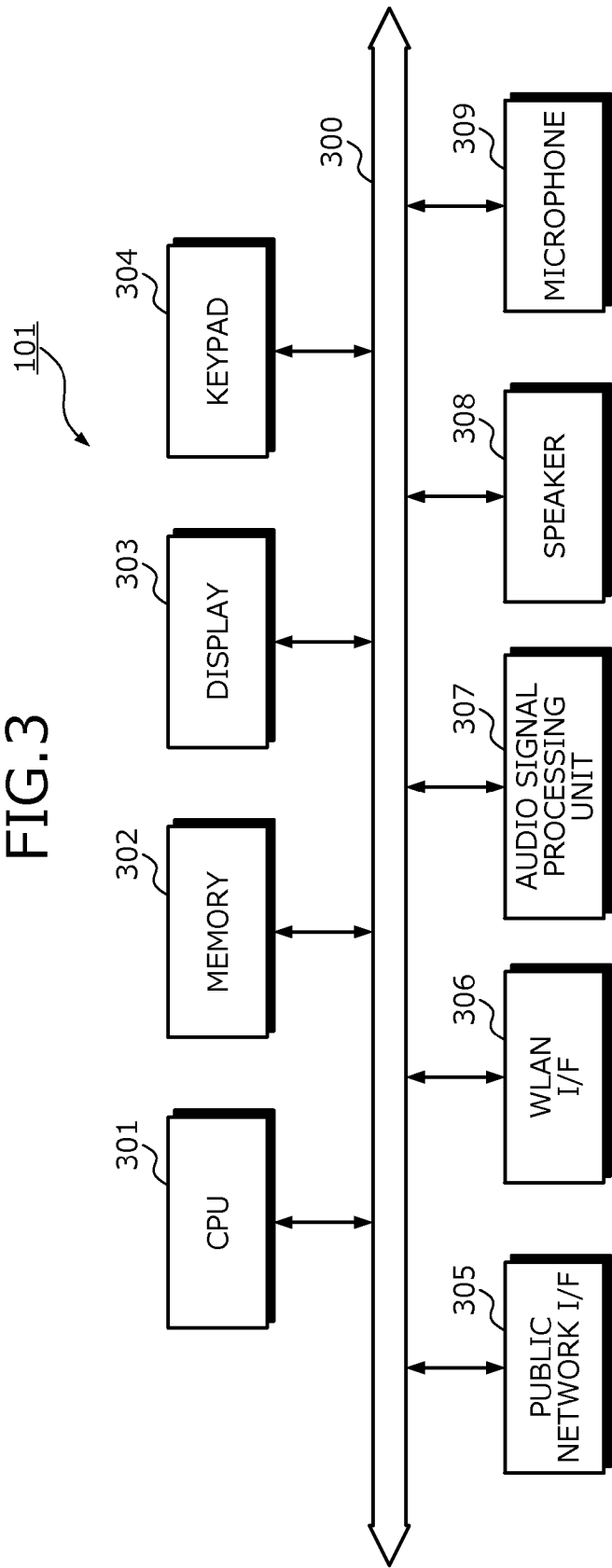
FIG. 3 is a block diagram of a hardware configuration example of a mobile terminal device 101.

FIG. 3 is a block diagram of a hardware configuration example of the mobile terminal device 101. In FIG. 3, the mobile terminal device 101 includes a CPU 301, memory 302, a display 303, a keypad 304, a public network interface (I/F) 305, a wireless LAN (WLAN) I/F 306, an audio signal processing unit 307, a speaker 308, and a microphone 309. The components are connected to one another via a bus 300.

The CPU 301 provides general control for the mobile terminal device 101. The memory 302 includes, for example, read only memory (ROM), random access memory (RAM), flash ROM, etc. For example, the flash ROM stores programs of an operating system (OS); the ROM stores application programs; and the RAM is used as a work area of the CPU 301. The programs stored in the memory 302 are loaded onto the CPU 301 by which coded processes are executed by the CPU 301.

The display 303 displays data such as documents, images, and function information in addition to a cursor, icons, and toolboxes. The display 303 can be, for example, a liquid crystal display or an organic electroluminescence (EL) display. The screen 110 depicted in FIG. 1 corresponds to the display 303.

The keypad 304 includes keys for the input of letters, numerals, various instructions, etc., and performs data input. The keypad 304 can be for example a touch-panel input pad, a numeric key pad, a power button, etc.

The public network I/F 305 is connected via a base station BSi of the mobile communications network to the network 210 and is connected via the network 210 to other computers (e.g., the server 201). The public network I/F 305 manages an internal interface with the network 210 and controls the input and output of data with respect to other computers.

The WLAN I/F 306 is connected via an access point APj of the wireless LAN to the network 210 and is connected via the network 210 to other computers. The WLAN I/F 306 manages an internal interface with the network 210 and controls the input and output of data with respect to other computers.

The audio signal processing unit 307 is connected to the speaker 308 and the microphone 309. For example, sound received by the microphone 309 is A/D converted in the audio signal processing unit 307. The sound is output from the speaker 308.

Although not depicted, in addition to the above components, the mobile terminal device 101 has, for example, a memory controller that controls the reading and writing of data with respect to the memory 302, a power management unit (PMU) that supplies power voltage to the components, a battery, various timers, and a global positioning system (GPS) unit. The hardware configurations of the base station BSi and the access point APj are realized by the CPU, the memory, the I/F, an auxiliary storage device, the bus, etc.

An ESSID table 400 used by the mobile terminal device 101 will be described. The ESSID table 400 is realized by the memory 302 depicted in FIG. 3, for example. The connection information 120 depicted in FIG. 1 corresponds to the ESSID table 400.

Figure 4:
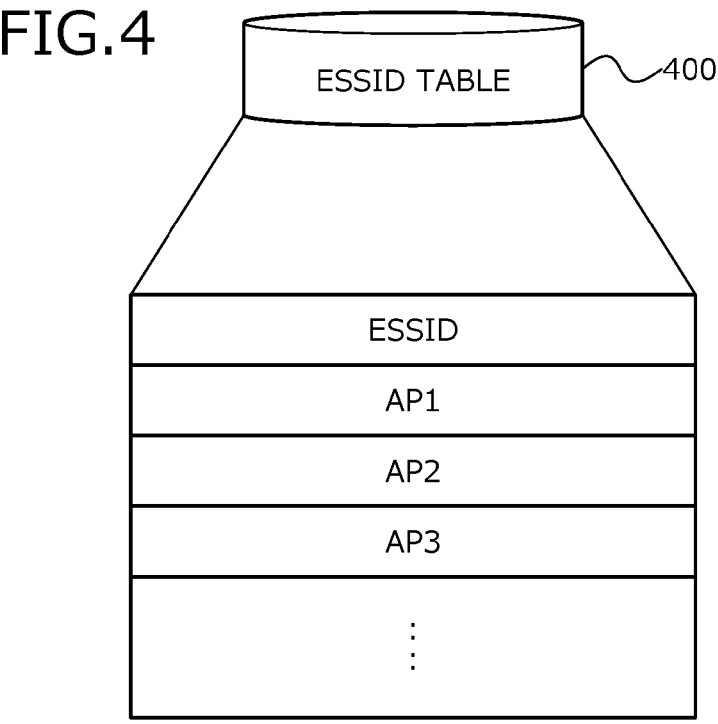
FIG. 4 is an explanatory diagram of an example of storage contents of an ESSID table 400.

FIG. 4 is an explanatory diagram of an example of the storage contents of the ESSID table 400. The ESSID table 400 stores the ESSID of an access point APj through which the mobile terminal device 101 has been connected to the network 210.

By referring to the ESSID table 400, the mobile terminal device 101 can identify the ESSID (e.g., AP1, AP2, AP3) of an access point APj available to the user of the mobile terminal device 101.

The storage contents of the ESSID table 400 are updated, for example, at the time of a first connection to an access point APj. For example, at the time of the first connection to the access point APj by a user input operation, the ESSID of the connected access point APj is newly registered into the ESSID table 400.

A connection performance table 500 used by the mobile terminal device 101 will be described. The connection performance table 500 is realized by the memory 302 depicted in FIG. 3, for example. The connection history information 130 depicted in FIG. 1 corresponds to the connection performance table 500.

Figure 5:
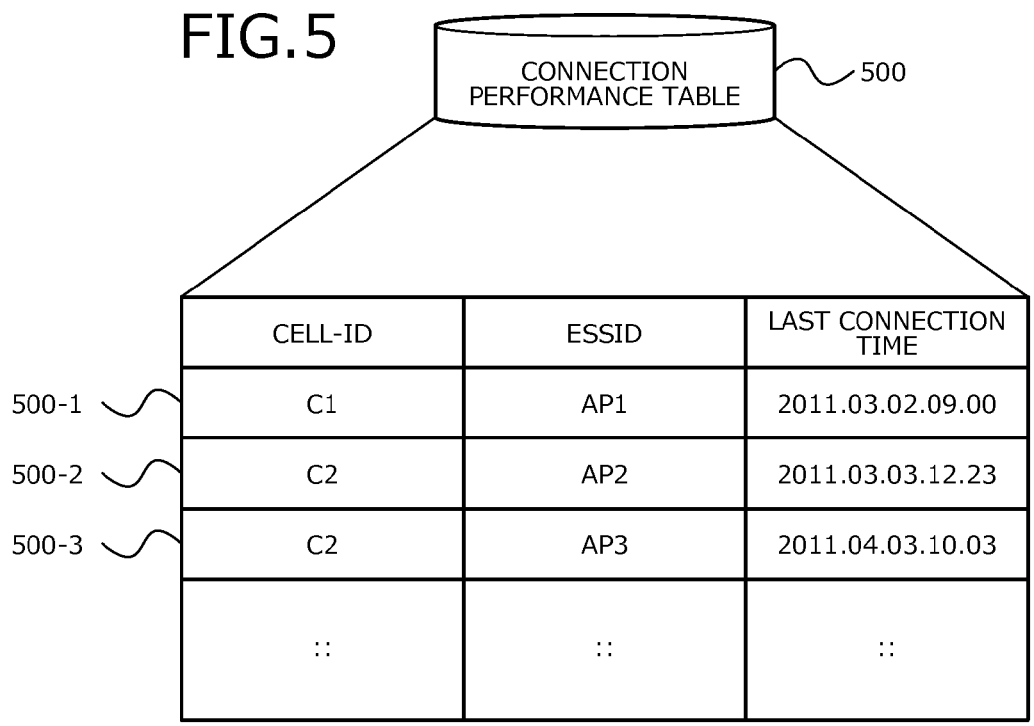
FIG. 5 is an explanatory diagram of an example of storage contents of a connection performance table 500.

FIG. 5 is an explanatory diagram of an example of the storage contents of the connection performance table 500. In FIG. 5, the connection performance table 500 has fields including cell-ID, ESSID, and last connection time. By setting information into the fields, connection performance information (e.g., connection performance information 500-1 to 500-3) is stored as records.

The cell-ID is area identification information identifying a cell Ci of a base station BSi of the mobile communications network. The ESSID is access point identification information identifying an access point APj of the wireless LAN. The last connection time is a date and time of the last connection to an access point APj.

As an example, in the case of the connection performance information 500-1, the cell-ID "C1", the ESSID "AP1", and the last connection time "2011.03.02.09.00" are correlated with one another. By the connection performance information 500-1, the date and time "9:00 am on Mar. 2, 2011" of the last connection to the access point aP1 from the communication device 101 in the cell C1 of the base station BS1 can be identified.

Although the description above is given of a case where the ESSID of the access point APj is used as the access point identification information, configuration is not limited hereto. For example, the BSSID of the access point APj or both the ESSID and the BSSID of the access point APj may be used as the access point identification information.

Figure 6:
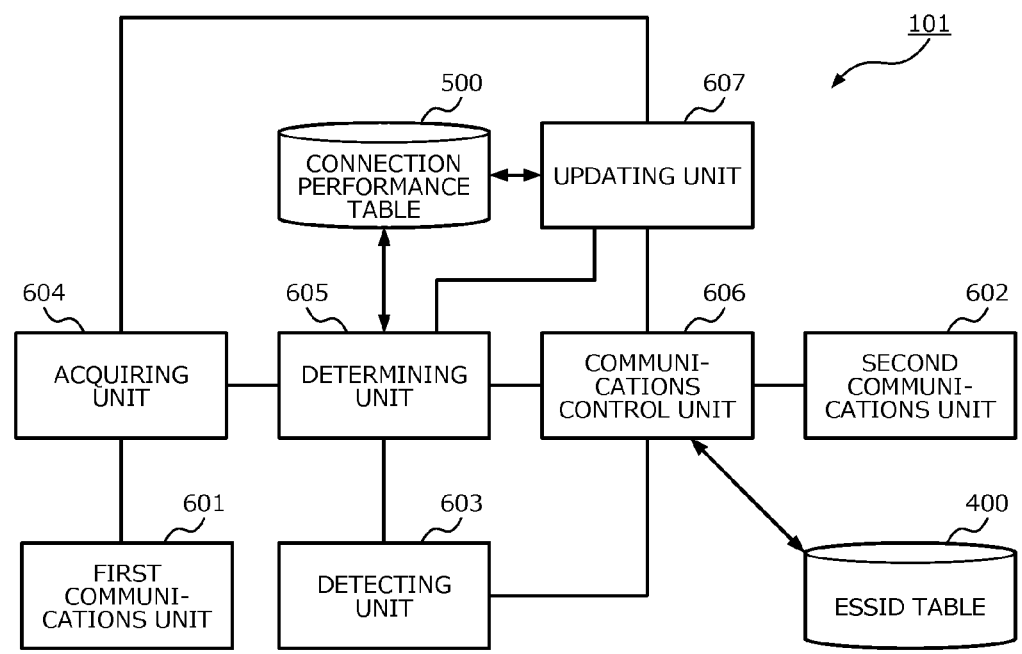
FIG. 6 is a block diagram of a functional configuration example of the mobile terminal device 101 according to the first embodiment.

FIG. 6 is a block diagram of a functional configuration example of the mobile terminal device 101 according to the first embodiment. In FIG. 6, the mobile terminal device 101 is configured to include a first communications unit 601, a second communications unit 602, a detecting unit 603, an acquiring unit 604, a determining unit 605, a communications control unit 606, and an updating unit 607. The first communications unit 601 to the updating unit 607 function as a control unit and functions thereof are realized, for example, by causing the CPU 301 to execute a program stored in the memory 302 depicted in FIG. 3 or by hardware such as the public network I/F 305 and the WLAN I/F 306. Processing results of the functional units are stored in the memory 302 for example.

The first communications unit 601 has a function of communicating with a base station BSi. For example, the first communications unit 601 receives base station information including the cell-ID of a cell Ci from a communicable base station BSi among the base stations BS1 to BSn, cyclically (e.g., every 2.56 sec). For example, if the cell-ID included in the received base station information is different from a cell-ID included in the last received base station information, the mobile terminal device 101 communicates with the base station BSi to register the position of the mobile terminal device 101.

The second communications unit 602 has a function of communicating with an access point APj. For example, the second communications unit 602 connects to the network 210 by way of the access point APj.

The detecting unit 603 has a function of detecting a transition from non-display to display in the display state of the display 303 (see FIG. 3). For example, if the display state of the display 303 is switched from non-display to display by user operation input via the keypad 304, the detecting unit 603 detects a transition from non-display to display in the display state of the display 303.

For example, if the operation is resumed from the state immediately before the display state of the display 303 changes to non-display, the detecting unit 603 may detect the transition from non-display to display in the display state of the display 303. Alternatively, for example, if an application such as alarm activated at a predetermined time is activated, the detecting unit 603 may detect the transition from non-display to display in the display state of the display 303.

The detecting unit 603 has a function of detecting a transition from display to non-display in the display state of the display 303. For example, if the display state of the display 303 is switched from display to non-display by user operation input via the keypad 304, the detecting unit 603 detects a transition from display to non-display in the display state of the display 303.

For example, if a screen OFF timer reaches a given value, the detecting unit 603 may detect the transition from display to non-display in the display state of the display 303. The screen OFF timer is a timer that measures the time for the transition from display to non-display in the display state of the display 303. Furthermore, for example, in a case of shifting to a power savings mode suppressing the power supply to the display 303, the detecting unit 603 may detect the transition from display to non-display in the display state of the display 303.

The acquiring unit 604 has a function of acquiring the cell-ID identifying the cell Ci to which the mobile device 101 belongs among the cells C1 to Cn of the base stations BS1 to BSn. For example, the acquiring unit 604 acquires, as the cell-ID of the cell Ci to which the mobile device 101 belongs, the cell-ID included in the base station information received by the first communications unit 601 communicating with a base station BSi.

Among the base station BS1 to BSn, there may be plural base stations communicable with the mobile terminal device 101. In this case, the acquiring unit 604 may acquire, as the cell-ID identifying the cell Ci to which the mobile device 101 belongs, the cell-ID included in the base station information of the base station with the highest field intensity among the communicable base stations.

The determining unit 605 has a function of determining whether connection to an access point APj in the cell Ci to which the mobile device 101 belongs has been performed. As used herein, connection to an access point APj refers to connection history indicative of the completion of an operation of connecting to an access point APj. The operation of connecting to an access point APj refers to an operation connecting to the network 210 via the access point APj, by the mobile terminal device 101.

For example, the determining unit 605 first determines whether the predetermined tine T has elapsed since the detecting unit 603 detected a transition in the display state, from non-display to display. If the predetermined period T has elapsed, then the determining unit 605 refers to the connection performance table 500 and determines whether the ESSID of an access point APj stored correlated with the cell-ID acquired by the acquiring unit 604 is registered.

If the ESSID of such an access point APj is registered, the determining unit 605 determines that connection to the access point APj in the cell Ci to which the mobile terminal device 101 belongs has been performed. On the other hand, if no ESSID of such an access point APj is registered, the determining unit 605 determines that connection to the access point APj in the cell Ci to which the mobile terminal device 101 belongs has not been performed.

Even if the mobile terminal device 101 is within a communication range of an access point APj, the access point APj may not be found by a single scanning operation. For example, the mobile terminal device 101 searches for an available access point APj by receiving a probe response signal that includes the ESSID, as a result of sending a probe request signal to channels (CHs) used in the wireless LAN.

In this case, immediately before the probe response signal is received from an available access point APj, the mobile terminal device 101 may receive a probe response signal from another access point. In this case, the mobile terminal device 101 may not be able to receive the probe response signal from the available access point APj consequent to being in the process of processing the probe response signal from the other access point.

For this reason, the predetermined period T is set to a period (e.g., 2 min) that is long enough for operations to scan for an access point APj to be executed multiple times, for example. The predetermined period T is stored in the memory 302, for example. The time elapsing from the detection of a transition from non-display to display in the display state can be measured by a timer for example.

In the description hereinafter, a "scan timer" refers to the timer measuring the elapse of time from the detection of a transition from non-display to display in the display state of the display 303.

The communications control unit 606 has a function of controlling the scanning operation for an access point APj. An example of an operation to detect an access point APj will be described. For example, the communications control unit 606 controls the second communications unit 602 to send a probe request signal to the channels (CHs) used in the wireless LAN. As a result, the communications control unit 606 receives a probe response signal that includes an ESSID, thereby enabling detection of a communicable access point APj.

For example, if the detecting unit 603 detects a transition from non-display to display in the display state, the communications control unit 606 controls the second communications unit 602 to start the operation to detect an access point APj. Describing in more detail, the communications control unit 606 sets a scanning operation flag to ON so that the second communications unit 602 starts a cyclic scanning operation for the access point APj.

The scanning operation flag is a flag indicative of whether to perform the cyclic scanning operation for an access point APj. The scanning operation flag is stored in the memory 302 or a register of the CPU 301, for example. This enables the scanning operation for an access point APj to be performed cyclically during the time that the scanning operation flag is set to ON.

The cycle of the scanning operation of the access point APj can be set arbitrarily. When the scanning operation for an access point APj is performed cyclically, the start timing is controlled by a timer, for example.

The communications control unit 606 controls the scanning operation for an access point APj, based on a result of determination made by the determining unit 605. For example, if the determining unit 605 determines after the elapse of the predetermined period T, that connection to an access point APj in the cell Ci to which mobile terminal device 101 belongs has been performed, the communications control unit 606 controls the second communications unit 602 to continue the scanning operation of the access point APj.

On the other hand, if the determining unit 605 determines after the elapse of the predetermined period T, that connection to an access point APj in the cell Ci to which the mobile terminal device 101 belongs has not been performed, the communications control unit 606 controls the second communications unit 602 to discontinue the scanning operation for an access point APj. Describing in more detail, the communications control unit 606 sets the scanning operation flag to OFF, thereby enabling the cyclic operation of scanning for an access point APj by the second communications unit 602 to be discontinued.

The communications control unit 606 has a function of controlling the second communications unit 602 to start an operation of connecting to an access point APj. For example, the communications control unit 606 refers to the ESSID table 400 depicted in FIG. 4 to determine whether the ESSID of an access point APj found by the scanning operation is therein.

If the ESSID is registered, the communications control unit 606 controls the second communications unit 602 to start the operation of connecting to the access point APj. On the other hand, if the ESSID is not registered, the communications control unit 606 does not start the operation of connecting to the access point APj.

In response to user operation input, the communications control unit 606 may control the second communications unit 602 to start the operation of connecting to an access point APj found by the scanning operation. For example, at the time of a first connection to an access point APj, the communications control unit 606 controls the second communications unit 602 in response to user operation input, to start the operation of connecting to the access point APj. In this case, the communications control unit 606 may newly register the ESSID of the connected access point APj into the ESSID table 400.

If the detecting unit 603 detects a transition from display to non-display in the display state of the display 303, the communications control unit 606 may control the second communications unit 602 to discontinue the scanning operation for an access point APj. Hence, when the display state of the display 303 is non-display, the scanning operation for an access point APj is suspended so that the power consumption of the mobile terminal device 101 can be suppressed.

If a transition from display to non-display in the display state of the display 303 is detected, when a certain time t has elapsed from the transition to non-display in the display state, the communications control unit 606 may control the second communications unit 602 to discontinue the scanning operation for an access point APj. Accordingly, assuming a case where the display state transitions from non-display to display immediately after the transition from display to non-display in the display state of the display 303, the scanning operation flag may remain active.

The updating unit 607 has a function of updating the time of connection to an access point APj when the connection to the access point APj has been completed. As used herein, the time of connection refers to, for example, the last time of connection to the access point APj.

For example, the updating unit 607 first retrieves, from the connection performance table 500, connection performance information corresponding to the combination of the cell-ID of the cell Ci to which the mobile terminal device 101 belongs and the ESSID of the access point APj completing the connection. The updating unit 607 then overwrites the time of connection to the access point APj into the last connection time field of the retrieved connection performance information.

The updating unit 607 may retrieve, from the connection performance table 500, connection performance information corresponding to the cell-ID of the cell Ci to which the mobile terminal device 101 belongs. In this case, the updating unit 607 overwrites the ESSID of the detected access point APj into the ESSID field of the retrieved connection performance information. The updating unit 607 overwrites the detected time of connection to the detected access point APj into the last connection time field of the retrieved connection performance information.

In the absence of connection to an access point APj in the cell Ci to which the mobile terminal device 101 belongs, connection performance information is not retrieved that corresponds to the cell-ID of the cell Ci to which the mobile terminal device 101 belongs. In this case, the updating unit 607 sets the cell-ID of the cell Ci to which the mobile terminal device 101 belongs, the ESSID of the detected access point APj, and the connection time into the respective fields of the connection performance table 500. As a result, new connection performance information is newly registered as a record in the connection performance table 500.

In the case of registering new connection performance information into the connection performance table 500, the updating unit may calculate the sum M of connection performance information stored in the connection performance table 500. Then, if the calculated sum M is not less than a threshold value $M_{max}$, the updating unit 607 may delete the connection performance information having the oldest last connection time among connection performance information stored in the connection performance table 500.

The threshold value $M_{max}$ represents the upper limit of connection performance information that can be registered into the connection performance table 500. The threshold value $M_{max}$ can be set arbitrarily and, for example, is set in advance and stored in the memory 302. By setting the upper limit to the sum M of the connection performance information that can be registered into the connection performance table 500 in this manner, the number of records in the connection performance table 500 can be prevented from increasing beyond the upper limit.

The detecting unit 603 may detect a release of a locked state after the transition from non-display to display in the display state of the display 303. The locked state is a state where user operation input is prohibited. When in the locked state, for example, the mobile terminal device 101 falls into a state not accepting operations other than an operation input that releases the locked state. For example, if the user performs the operation input for releasing the locked state by using the keypad 304, the detecting unit 603 detects a release of the locked state of the display 303.

In this case, if the detecting unit 603 detects the transition from non-display to display in the display state and the release of the locked state, the communications control unit 606 may control the second communications unit 602 to start the operation to detect an access point APj. Consequently, in the case of an erroneous transition from non-display to display in the display state of the display 303 or unauthorized use, the scanning operation for an access point APj is prohibited, enabling power consumption to be suppressed.

An operation example of the mobile terminal device 101 according to the first embodiment will be described with reference to FIGS. 7 to 10.

Figure 7:
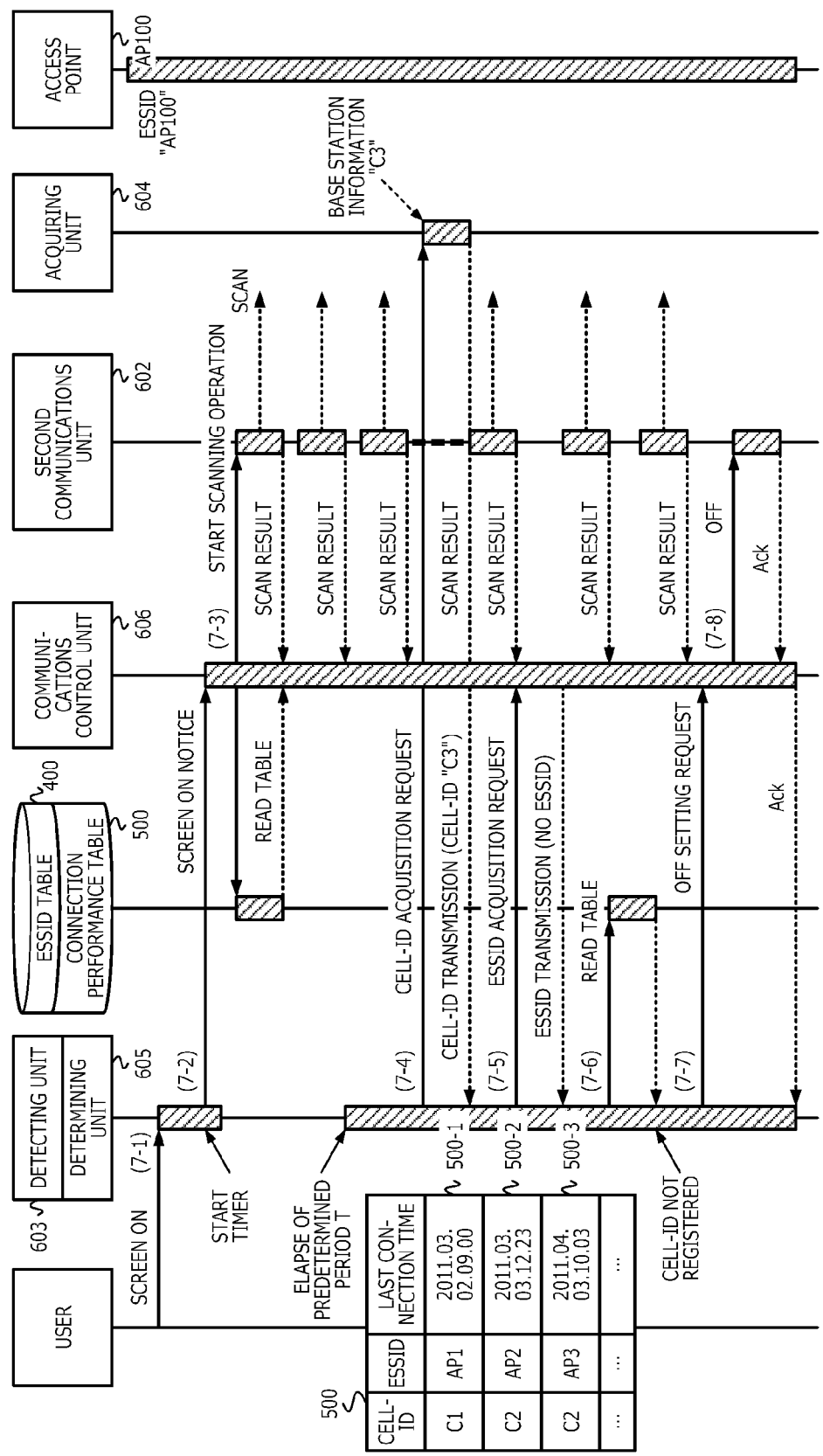
FIG. 7 is an explanatory diagram (part 1) of an operation example of the mobile terminal device 101 according to the first embodiment.

FIG. 7 is an explanatory diagram (part 1) of an operation example of the mobile terminal device 101 according to the first embodiment. The operation example of the mobile terminal device 101 depicted in FIG. 7 is an operation example in a case in which connection to an access point APj in the cell Ci to which the mobile terminal device 101 belongs has not been performed.

(7-1) The detecting unit 603 detects a transition from non-display to display in the display state of the display 303. In the example depicted in FIG. 7, a transition from non-display to display in the display state of the display 303 is detected as a result of switching of the display state of the display 303 from non-display to display by user operation input.

(7-2) If the detecting unit 603 detects a transition from non-display to display in the display state of the display 303, the detecting unit 603 gives a screen ON notice to the communications control unit 606 and starts a scan timer. The screen ON notice is a notice giving notification of the transition from non-display to display in the display state of the display 303.

(7-3) When receiving the screen ON notice, the communications control unit 606 controls the second communications unit 602 to start an operation to detect an access point APj. For example, the communications control unit 606 sets the scanning operation flag to ON so that the second communications unit 602 starts the cyclic scanning operation for an access point APj.

The communications control unit 606 reads the ESSID table 400 to determine whether the ESSID included in a scan result from the second communications unit 602 is in the ESSID table 400. The scan result is information that includes the ESSID of an access point APj found by the scanning operation.

If the ESSID is registered, the communications control unit 606 controls the second communications unit 602 to start the operation of connecting to the access point APj. On the other hand, if the ESSID is not registered, the communications control unit 606 does not start the operation of connecting to the access point APj. In the example depicted in FIG. 7, since an ESSID "AP100" of an access point aP100 found by the scanning operation is not registered in the ESSID table 400, the operation of connecting to the access point APj is not started.

(7-4) After the elapse of the predetermined period T from the start of the scan timer, the determining unit 605 requests the acquiring unit 604 to acquire the cell-ID of the cell Ci to which the mobile terminal device 101 belongs, whereby the determining unit 605 acquires the cell-ID of the cell Ci to which the mobile device 101 belongs. In the example depicted in FIG. 7, a cell-ID "C3" of the cell C3 to which the mobile terminal device 101 belongs is acquired.

(7-5) The determining unit 605 requests the communication control unit 606 to acquire the ESSID of the access point APj to which connection is made and thereby, acquires the ESSID of the access point APj to which connection is made. In the example depicted in FIG. 7, the determining unit 605 receives from the communications control unit 606, notification of "no ESSID" indicative of not being connected to an access point APj.

(7-6) The determining unit 605 reads the connection performance table 500 to determine whether connection to an access point APj in the cell Ci to which the mobile terminal device 101 belongs has been performed. In the example depicted in FIG. 7, it is determined that connection to an access point APj has not been performed.

(7-7) The determining unit 605 sends to the communications control unit 606, an OFF setting request for the scanning operation flag. The OFF setting request is a request to set the scanning operation flag to OFF.

(7-8) When receiving the scanning operation flag OFF setting request, the communications control unit 606 returns Ack to the determining unit 605 to set the scanning operation to OFF if the scanning operation flag is ON. This results in the suspension of the cyclic scanning operation for an access point APj performed by the second communications unit 602.

In this manner, according to the mobile terminal device 101, the screen ON can trigger the cyclic scanning operation for an access point APj. In the case of no connection being performed to an access point APj irrespective of the elapse of the predetermined period T from the screen ON, the cyclic scanning operation for an access point APj can be discontinued.

At (7-7) above, the determining unit 605 may read out the scanning operation flag and, if the scanning operation flag is ON, send a scanning operation flag OFF setting request to the communications control unit 606. This stops the sending of an OFF setting request in the case of the scanning operation flag OFF so that the processing load of the mobile terminal device 101 can be reduced.

Figure 8:
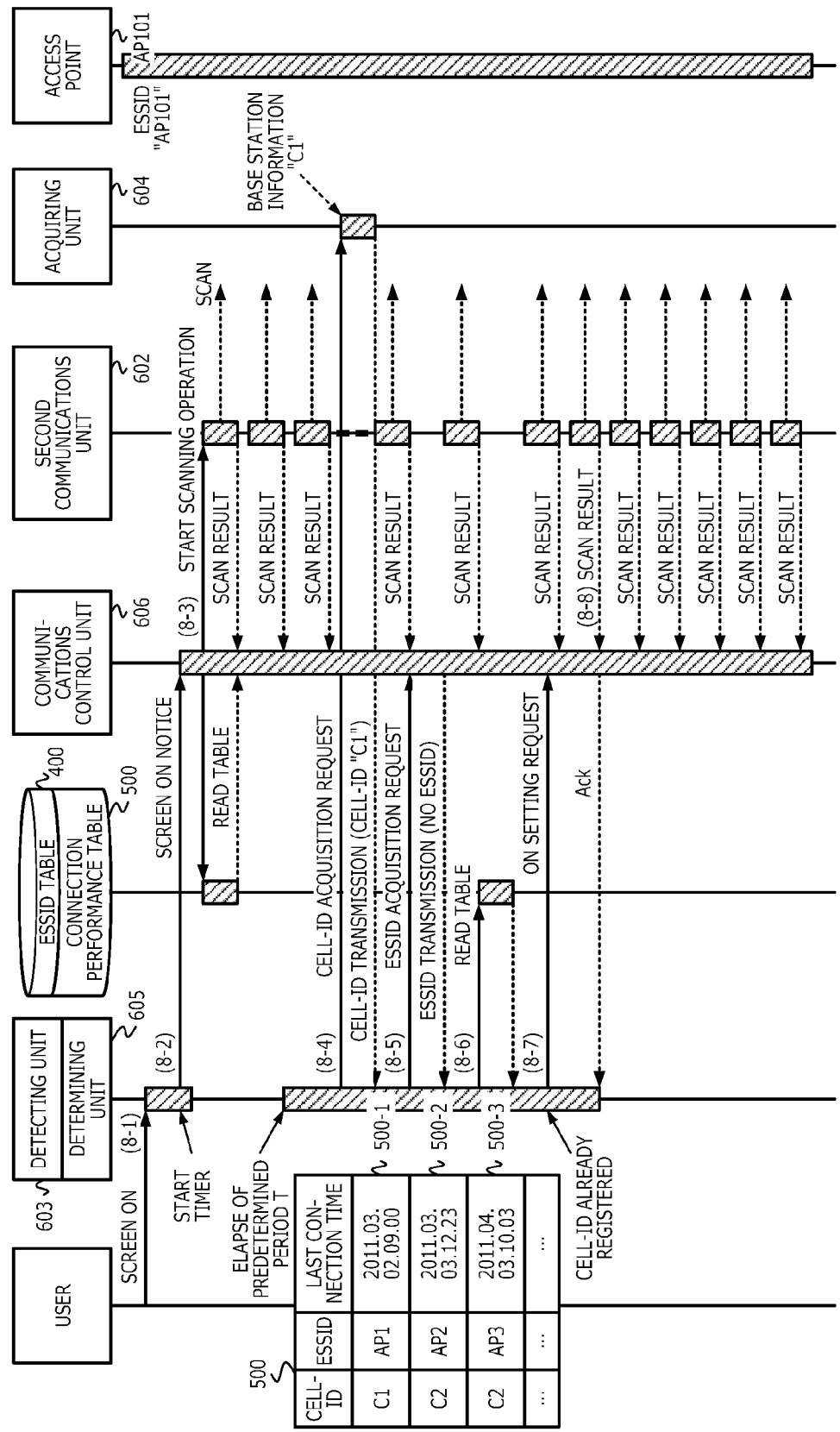
FIG. 8 is an explanatory diagram (part 2) of an operation example of the mobile terminal device 101 according to the first embodiment.

FIG. 8 is an explanatory diagram (part 2) of an operation example of the mobile terminal device 101 according to the first embodiment. The operation example of the mobile terminal device 101 depicted in FIG. 8 is an operation example in a case in which connection to an access point APj in the cell Ci to which the mobile device 101 belongs has been performed.

Operations (8-1) to (8-5) depicted in FIG. 8 are the same as the operations (7-1) to (7-5) depicted in FIG. 7 and therefore, will not again be described.

(8-6) The determining unit 605 reads the connection performance table 500 and determines whether connection to an access point APj in the cell Ci to which the mobile device 101 belongs has been performed. In the example depicted in FIG. 8, since connection performance information corresponding to an acquired cell-ID "C1" has already been registered, it is determined that connection to an access point APj has been performed.

(8-7) The determining unit 605 sends to the communications control unit 606, an ON setting request for the scanning operation flag. The ON setting request is a request to set the scanning operation flag to ON.

(8-8) When receiving the scanning operation flag ON setting request, the communications control unit 606 returns an Ack to the determining unit 605 and, if the scanning operation flag is OFF, sets the scanning operation flag to ON. In the example depicted in FIG. 8, since the scanning operation flag is ON, the second communications unit 602 continues to perform the cyclic scanning operation for the access point APj.

In this manner, according to the mobile terminal device 101, the screen ON can trigger the start of the cyclic scanning operation for the access point APj. Even though connection to the access point APj has not yet been made after the elapse of the predetermined period T, the cyclic scanning operation for the access point APj can be continued if connection to the access point APj in the cell Ci to which the mobile device 101 belongs has been performed.

In at (8-7) above, the determining unit 605 may read out a scanning operation flag and, if the scanning operation flag is OFF, send an ON setting request for the scanning operation flag to the communications control unit 606. This stops the sending of an ON setting request when the scanning operation flag is ON so that the processing load of the mobile terminal device 101 can be reduced.

Figure 9:
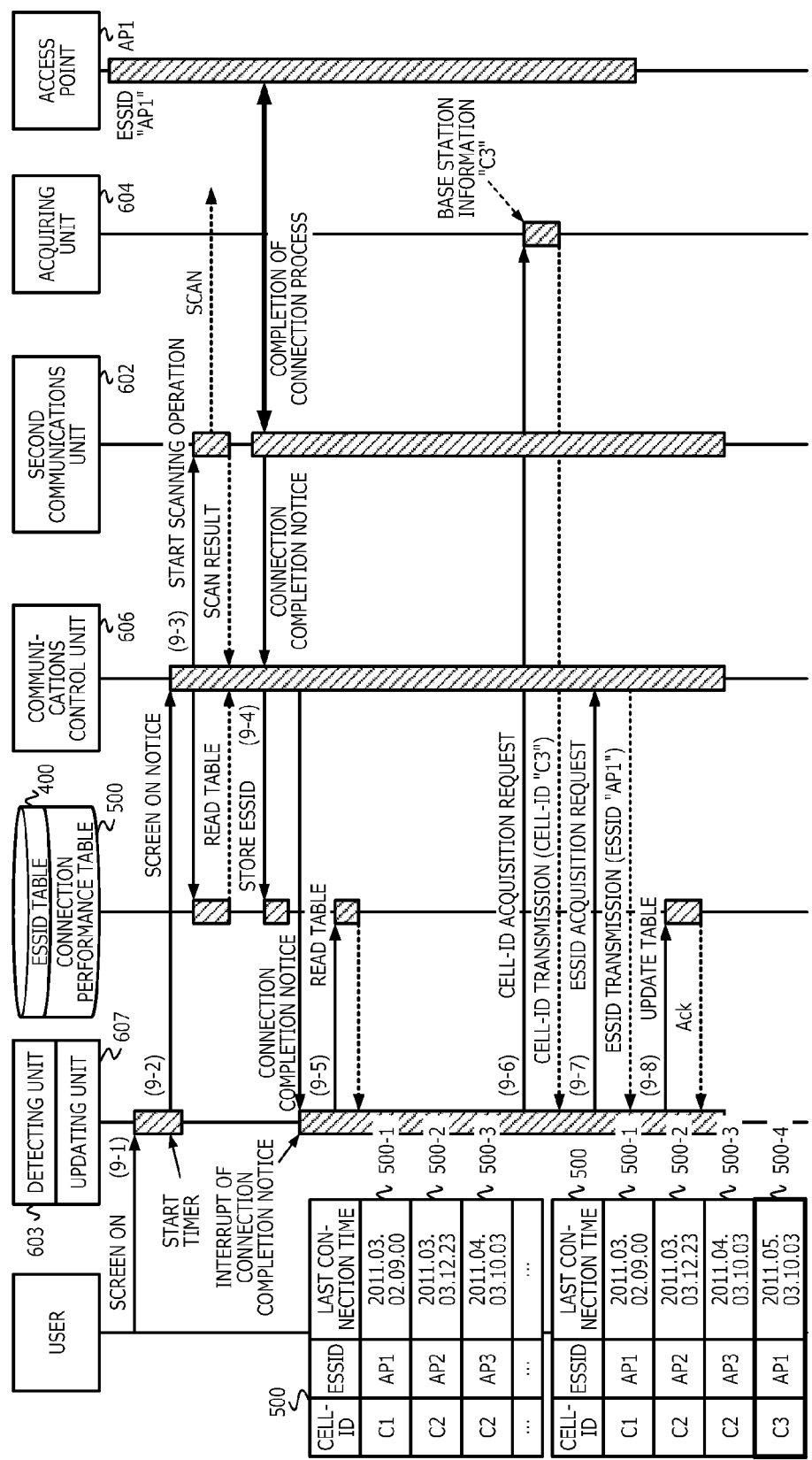
FIG. 9 is an explanatory diagram (part 3) of an operation example of the mobile terminal device 101 according to the first embodiment.

FIG. 9 is an explanatory diagram (part 3) of an operation example of the mobile terminal device 101 according to the first embodiment. The operation example of the mobile terminal device 101 depicted in FIG. 9 is an operation example in a case where the updating unit 607 receives a connection completion notice (an interrupt notice) from the communications control unit 606 as a result of completion of connection to an access point APj during the cyclic scanning operation for an access point APj.

(9-1) The detecting unit 603 detects a transition from non-display to display in the display state of the display 303. In the example depicted in FIG. 9, it is detected that the display state of the display 303 has transitioned from non-display to display, as a result of switching of the display state from non-display to display by user operation input.

(9-2) When detecting a transition from non-display to display in the display state of the display 303, the detecting unit 603 sends a screen ON notice to the communications control unit 606 and starts the scan timer.

(9-3) When receiving the screen ON notice, the communications control unit 606 controls the second communications unit 602 to start an operation to detect an access point APj. If an ESSID included the scan result from the second communications unit 602 is in the ESSID table 400, the communications control unit 606 controls the second communications unit 602 to start an operation of connecting to the access point APj.

In the example depicted in FIG. 9, an ESSID "AP1" of an access point aP1 found by the scanning operation has already been registered in the ESSID table 400, and the operation of connecting to the access point APj is started.

(9-4) When receiving a connection completion notice from the second communications unit 602, the communications control unit 606 stores the ESSID of the connection-completed access point aP1 into the memory 302 and sends a connection completion notice to the updating unit 607. The connection completion notice may include the ESSID of the connection-completed access point aP1.

(9-5) If the updating unit 607 receives the connection completion notice from the communications control unit 606 before the elapse of the predetermined period T from the start of the scan timer, the updating unit 607 reads the connection performance table 500.

(9-6) The updating unit 607 requests the acquiring unit 604 to acquire the cell-ID of the cell Ci to which the mobile device 101 belongs and thereby, acquires the cell-ID of the cell Ci to which the mobile device 101 belongs. In the example depicted in FIG. 9, a cell-ID "C3" of a cell C3 to which the mobile device 101 belongs is acquired.

(9-7) The updating unit 607 requests the communications control unit 606 to acquire the ESSID of the access point APj to which connection has been made and thereby, acquires the ESSID of the access point APj to connection has been made. In the example depicted in FIG. 9, the communications control unit 606 notifies the updating unit 607 of an ESSID "AP1" of an access point aP1 to which connection has been made.

In a case where at the operation (9-5) above, the connection completion notice received from the communications control unit 606 includes the ESSID of the connection-completed access point aP1, the operation (9-7) may be omitted.

(9-8) The updating unit 607 updates the storage contents of the connection performance table 500. In the example depicted in FIG. 9, none of the fields of the connection performance table 500 indicate the cell-ID "C3" of the cell C3 to which the mobile terminal device 101 belongs nor the ESSID "AP1" of the access point aP1 and therefore, the cell-ID "C3", the ESSID "AP1" of the access point aP1 to which connection has been made, and the last connection time "2011.05.03.10.03" are added to the connection performance table 500. As a result, new connection performance information 500-4 is newly registered as a record into the connection performance table 500.

In this manner, according to the mobile terminal device 101, the cyclic scanning operation for an access point APj can be started in response to the screen ON. The storage contents of the connection performance table 500 can be updated if the connection to the access point APj is completed before the elapse of the predetermined period T from the screen ON.

Although in the description above, the communications control unit 606 controls the second communications unit 602 to start the connecting operation to the access point APj, configuration is not limited hereto. For example, the second communications unit 602 may refer to information that is similar to the ESSID table 400 and determine whether connection to an access point APj has been performed, thereby starting the operation of connecting to the access point APj. In this case, the communications control unit 606 may receive a connection completion notice from the second communications unit 602 and register the ESSID included in the connection completion notice into the ESSID table 400.

Figure 10:
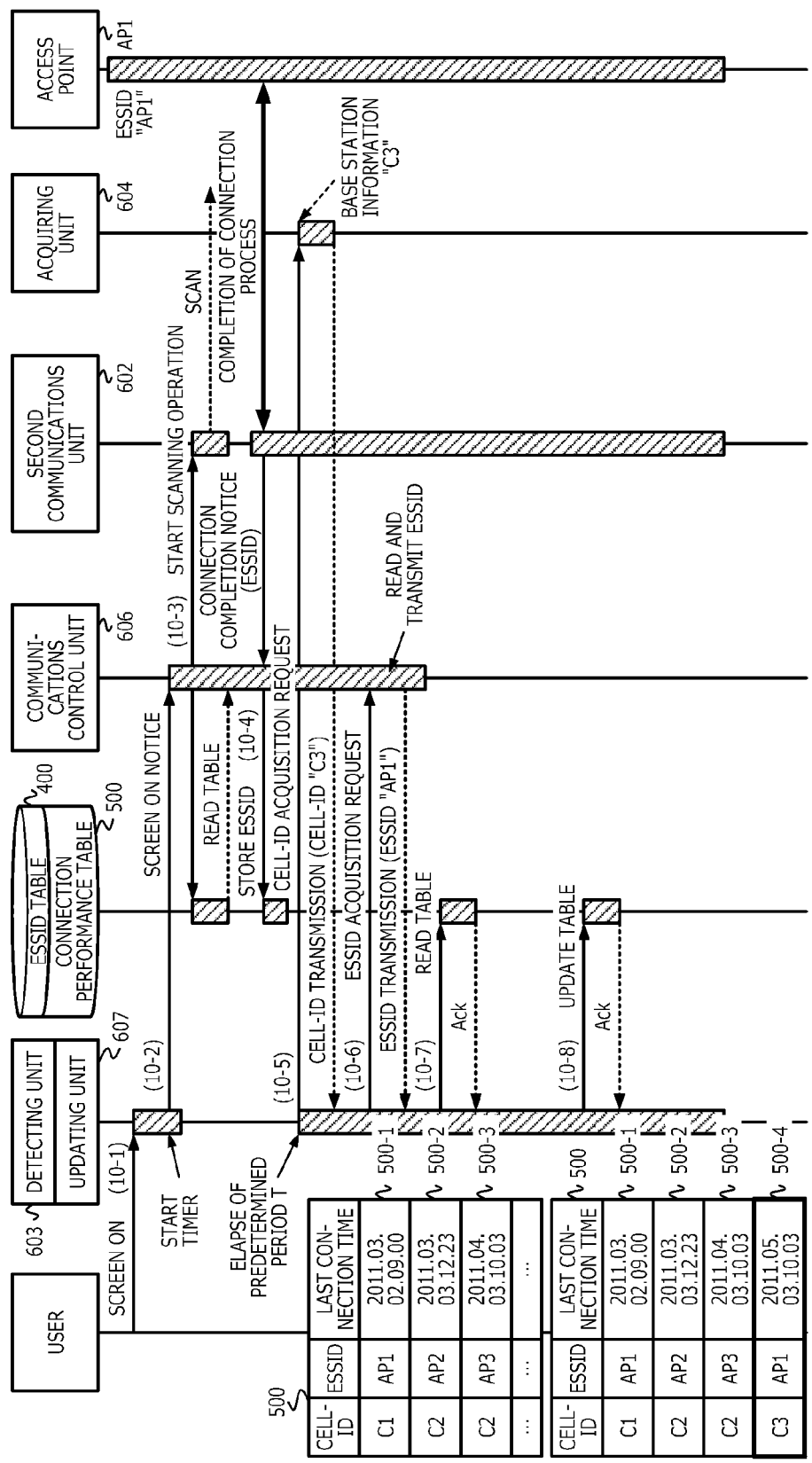
FIG. 10 is an explanatory diagram (part 4) of an operation example of the mobile terminal device 101 according to the first embodiment.

FIG. 10 is an explanatory diagram (part 4) of an operation example of the mobile terminal device 101 according to the first embodiment. The operation example of the mobile terminal device 101 depicted in FIG. 10 is an operation example in a case where as a result of completion of connection to an access point APj during the cyclic scanning operation for an access point APj, the storage contents of the connection performance table 500 are updated after the elapse of the predetermined period T.

(10-1) The detecting unit 603 detects that the display state of the display 303 has transitioned from non-display to display. In the example of FIG. 10, it is detected that the display state of the display 303 has transitioned from non-display to display as a result of switching of the display state from non-display to display by user operation input.

(10-2) When detecting the transition from non-display to display in the display state of the display 303, the detecting unit 603 sends a screen ON notice to the communications control unit 606 and starts the scan timer.

(10-3) When receiving the screen ON notice, the communications control unit 606 controls the second communications unit 602 to start an operation detecting of an access point APj. If the ESSID included in the scan result from the second communications unit 602 is in the ESSID table 400, the communications control unit 606 controls the second communications unit 602 to start the operation of connecting to the access point APj.

In the example depicted in FIG. 10, since the ESSID "AP1" of the access point aP1 found by the scanning operation has already been registered in the ESSID table 400, the operation of connecting to the access point APj is started.

(10-4) When receiving a connection completion notice from the second communications unit 602, the communications control unit 606 stores the ESSID of the connection-completed access point aP1 into the memory 302.

(10-5) After the elapse of the predetermined time from the start of the scan timer, the updating unit 607 requests the acquiring unit 604 to acquire the cell-ID of the cell Ci to which the mobile device 101 belongs and thereby, acquires the cell-ID of the cell Ci to which the mobile device 101 belongs. In the example depicted in FIG. 10, the cell-ID "C3" of the cell C3 to which the mobile device 101 belongs is acquired.

(10-6) The updating unit 607 requests the communications control unit 606 to acquire the ESSID of the access point APj to which connection has been made and thereby, acquires the ESSID of the access point APj to which connection has been made. In the example depicted in FIG. 10, the communications control unit 606 notifies the updating unit 607 of the ESSID "AP1" of the access point aP1 to which connection has been made.

The updating unit 607 may read out the ESSID stored in the memory 302 by the communications control unit 606 at operation (10-4) as being the ESSID of the access point APj to which connection has been made. In this case, operation (10-4) can be omitted.

(10-7) The updating unit 607 reads the connection performance table 500.

(10-8) The updating unit 607 updates the storage contents of the connection performance table 500. In the example depicted in FIG. 10, as a result of setting information into the fields of the connection performance table 500, new connection performance information 500-4 is newly registered as a record into the connection performance table 500.

In this manner, according to the mobile terminal device 101, the cyclic scanning operation for an access point APj can be started in response to the screen ON. In the case of completion of connection to the access point APj, the storage contents of the connection performance table 500 can be updated after the elapse of the predetermined period T from the screen ON.

Various process procedures of the mobile terminal device 101 according to the first embodiment will be described. Description will first be given of a determining process procedure of the mobile terminal device 101 determining whether connection to an access point APj in the cell Ci to which the mobile terminal device 101 belongs has been performed.

Figure 11:
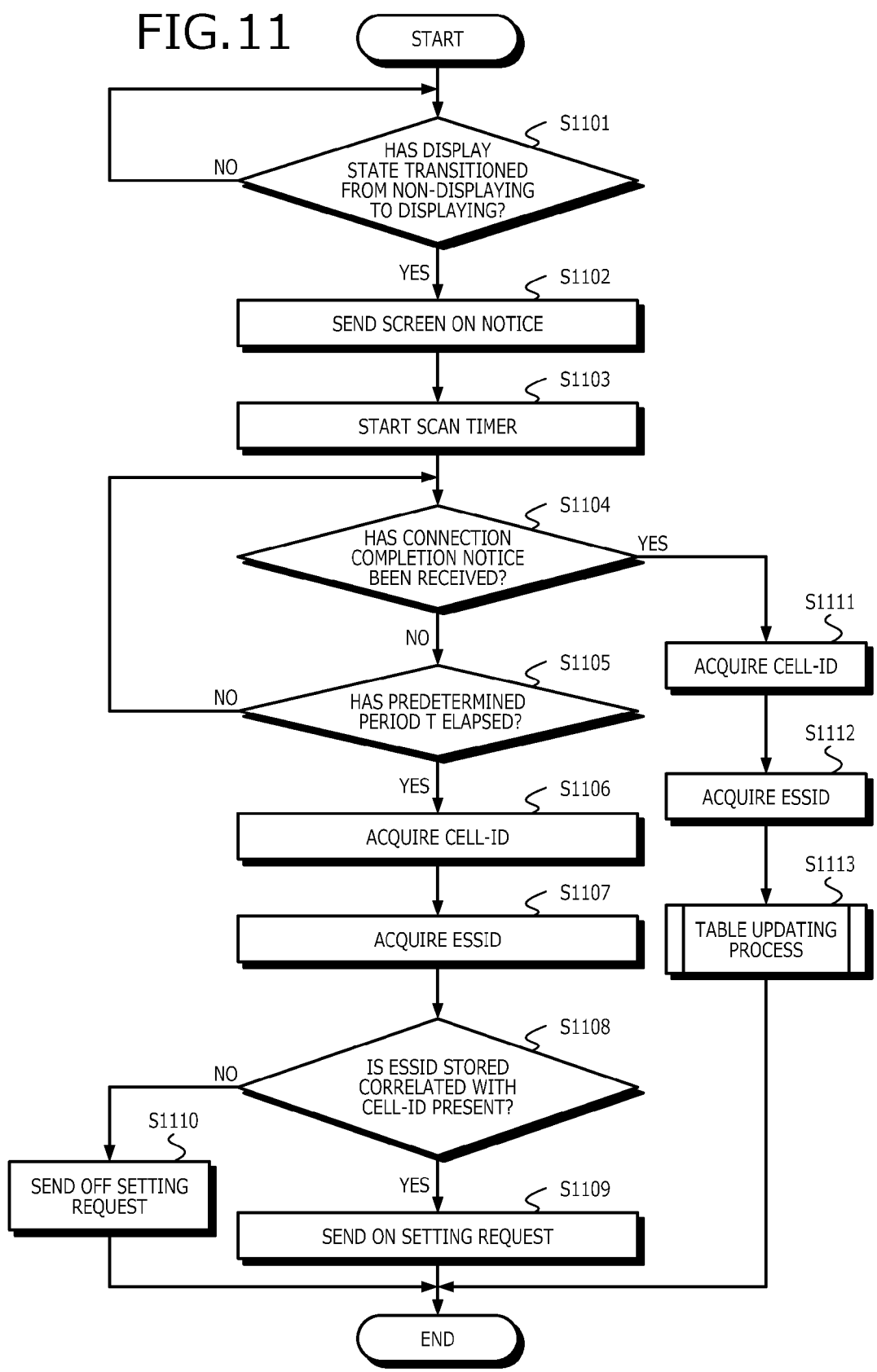
FIG. 11 is a flowchart of an example of a first determining process procedure of the mobile terminal device 101 according to the first embodiment.

FIG. 11 is a flowchart of an example of a first determining process procedure of the mobile terminal device 101 according to the first embodiment. In the flowchart depicted in FIG. 11, the detecting unit 603 determines whether the display state of the display 303 has transitioned from non-display to display (step S1101).

The detecting unit 603 waits for a transition from non-display to display in the display state of the display 303 (step S1101: NO). When the display state of the display 303 has transitioned from non-display to display (step S1101: YES), the detecting unit 603 sends a screen ON notice to the communications control unit 606 (step S1102) and starts a scan timer (step S1103).

The updating unit 607 then determines whether a connection completion notice has been received from the communications control unit 606 (step S1104). If a connection completion notice has not been received by the updating unit 607 (step S1104: NO), the determining unit 605 determines whether the predetermined period T has elapsed from the start of the scan timer (step S1105).

If the predetermined period T has not elapsed (step S1105: NO), the mobile terminal device 101 returns to step S1104. On the other hand, if the predetermined time has elapsed (step S1105: YES), the determining unit 605 requests the acquiring unit to acquire the cell-ID of the cell Ci to which the mobile device 101 belongs and thereby, acquires the cell-ID of the cell Ci to which the mobile device 101 belongs (step S1106).

The determining unit 605 then requests the communications control unit 606 to acquire the ESSID of the access point APj to which connection has been made and thereby acquires the ESSID of the access point APj to which connection has been made (step S1107). The determining unit 605 refers to the connection performance table 500 and determines whether an ESSID stored correlated with the cell-ID of the cell Ci to which the mobile device 101 belongs is registered (step S1108).

If an ESSID is registered (step S1108: YES), the determining unit 605 sends an ON setting request for the scanning operation flag to the communications control unit 606 (step S1109), and ends a series of operations according to this flowchart.

On the other hand, if no ESSID is registered (step S1108: NO), the determining unit 605 sends an OFF setting request of the scanning operation flag to the communications control unit 606 (step S1110), and ends a series of operations according to this flowchart.

If a connection completion notice has been received from the communications control unit 606 (step S1104: YES), the updating unit 607 requests the acquiring unit 604 to acquire the cell-ID of the cell Ci to which the mobile device 101 belongs and thereby, acquires the cell-ID of the cell Ci to which the mobile device 101 belongs (step S1111).

The updating unit 607 then requests the communications control unit 606 to acquire the ESSID of the access point APj to which connection has been made and thereby, acquires the ESSID of the access point APj to which connection has been made (step S1112). The updating unit 607 then executes a table updating process (step S1113), and ends a series of operations according to this flowchart.

The table updating process is a process updating the storage contents of the connection performance table 500. Specific processing contents of the table updating process will be described later with reference to FIG. 13.

Consequently, in the case of no connection to an access point APj despite the elapse of the predetermined period T since the screen ON, the cyclic scanning operation for an access point APj can be controlled according to the presence or absence of connection to an access point APj in the cell Ci to which the mobile device 101 belongs. If an interrupt occurs of a connection completion notice indicative of the completion of connection to the access point APj before the elapse of the predetermined time, the storage contents of the connection performance table 500 can be updated.

At step S1109, if the scanning operation flag is OFF as a result of readout of the scanning operation flag, the determining unit 605 may send a scanning operation flag ON setting request to the communications control unit 606. At step S1110, if the scanning operation flag is ON as a result of readout of the scanning operation flag, the determining unit 605 may send a scanning operation flag OFF setting request to the communications control unit 606. The operation at step S1107 may be omitted.

A second determining process procedure of the mobile terminal device 101 will be described. In the first determining process depicted in FIG. 11, description has been given of a case where there occurs an interrupt of a connection completion notice in the case of completion of connection to the access point APj, whereas in the second determining process, a case will be described in which there occurs no interrupt of the connection completion notice.

Figure 12:
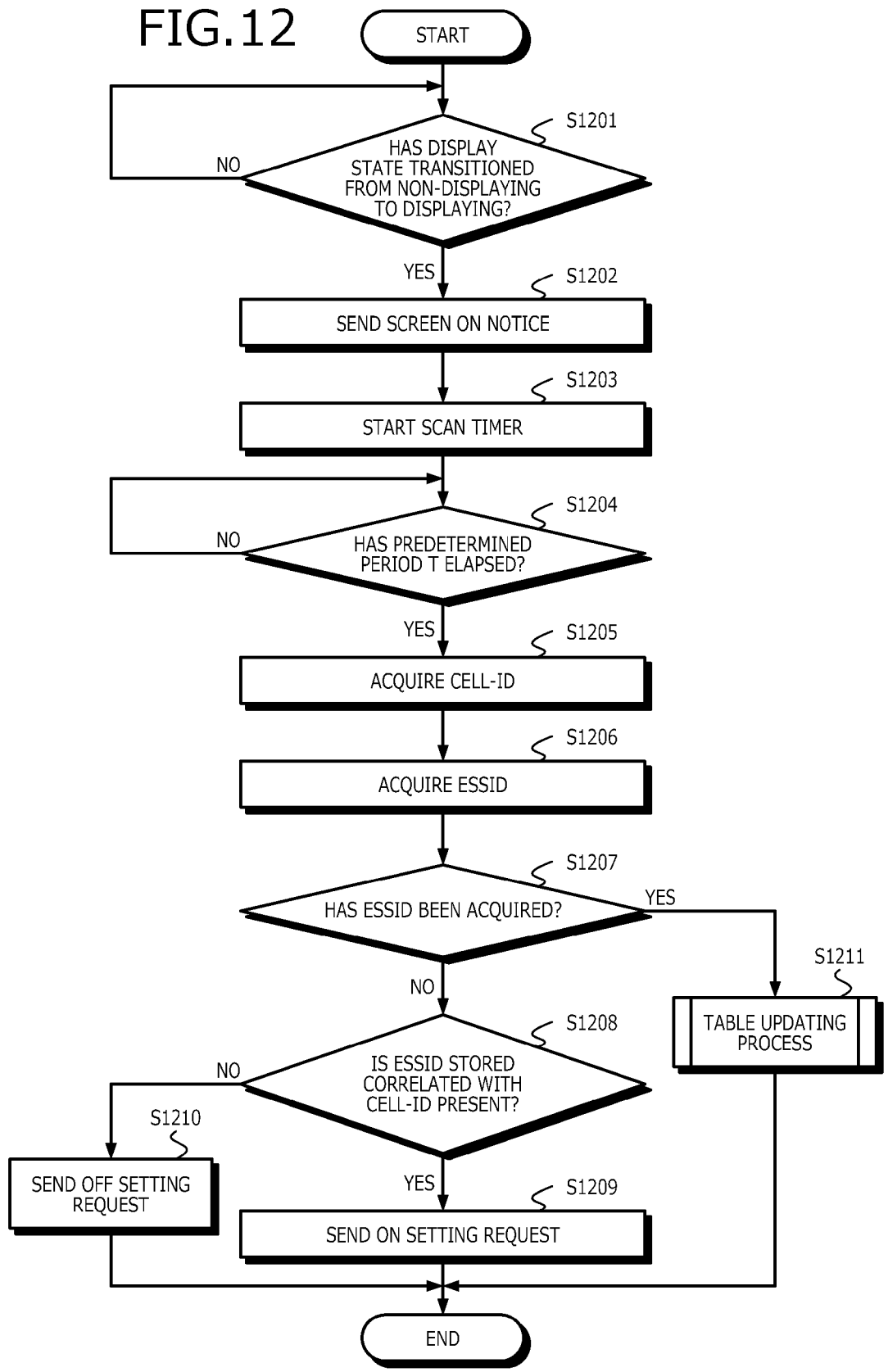
FIG. 12 is a flowchart of an example of a second determining process procedure of the mobile terminal device 101 according to the first embodiment.

FIG. 12 is a flowchart of an example of a second determining process procedure of the mobile terminal device 101 according to the first embodiment. In the flowchart depicted in FIG. 12, the detecting unit 603 determines whether the display state of the display 303 has transitioned from non-display to display (step S1201).

The detecting unit 603 waits for a transition from non-display to display in the display state of the display 303 (step S1201: NO). When the display state of the display 303 has transitioned from non-display to display (step S1201: YES), the detecting unit 603 sends a screen ON notice to the communications control unit 606 (step S1202) and starts a scan timer (step S1203).

The determining unit 605 then determines whether the predetermined period T has elapsed since the start of the scan timer (step S1204). Here, the determining unit 605 waits until the elapse of the predetermined period T from the start of the scan timer (step S1204: NO).

When the predetermined period T has elapsed (step S1204: YES), the determining unit 605 requests the acquiring unit 604 to acquire the cell-ID of the cell Ci to which the mobile device 101 belongs and thereby, acquires the cell-ID of the cell Ci to which the mobile device 101 belongs (step S1205).

The determining unit 605 then requests the communications control unit 606 to acquire the ESSID of the access point APj to which connection has been made and thereby, acquires the ESSID of the access point APj to which connection has been made (step S1206). The determining unit 605 then determines whether the ESSID of the access point APj to which connection has been made has been acquired (step S1207).

If the ESSID has not been acquired (step S1207: NO), the determining unit 605 refers to the connection performance table 500 and determines whether an ESSID stored correlated with the cell-ID to which the mobile device 101 belongs is registered (step S1208).

If an ESSID is registered (step S1208: YES), the determining unit 605 sends an ON setting request for the scanning operation flag to the communications control unit 606 (step S1209), and ends a series of operations according to this flowchart.

On the other hand, if no ESSID is registered (step S1208: NO), the determining unit 605 sends an OFF setting request for the scanning operation flag to the communications control unit 606 (step S1210), and ends a series of operations according to this flowchart.

At step S1207, if the ESSID has been acquired (step S1207: YES), the updating unit 607 executes a table updating process (step S1211), and ends a series of operations according to this flowchart.

Consequently, in the case of no connection to an access point APj despite the elapse of the predetermined period T since the screen ON, the cyclic scanning operation for an access point APj can be controlled according to the presence or absence of connection to the access point APj in the cell Ci to which the mobile device 101 belongs. If an interrupt occurs of a connection completion notice indicative of the completion of connection to the access point APj before the elapse of the predetermined time, the storage contents of the connection performance table 500 can be updated.

A specific process procedure will be described of the table updating operation at step S1113 depicted in FIG. 11 and step S1211 depicted in FIG. 12.

Figure 13:
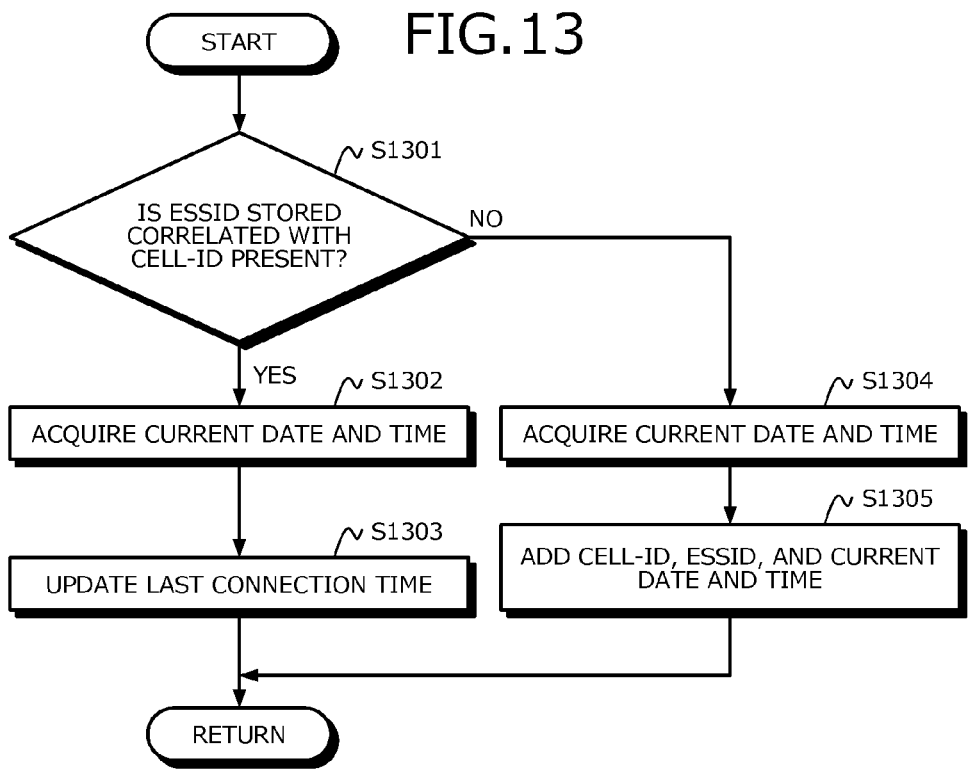
FIG. 13 is a flowchart of an example of a specific process procedure of a table updating process.

FIG. 13 is a flowchart of an example of a specific process procedure of the table updating process. In the flowchart depicted in FIG. 13, the updating unit 607 first refers to the connection performance table 500 to determine whether an ESSID stored correlated with the cell-ID of the cell Ci to which the mobile device 101 belongs is registered (step S1301).

If the ESSID is registered (step S1301: YES), the updating unit 607 acquires a current date and time (step S1302). The current date and time can be measured by, for example, a time clocking unit, not depicted, included in the mobile terminal device 101.

The updating unit 607 then updates in the connection performance table 500, the current date and time stored, correlated with the cell-ID of the cell Ci to which the mobile device 101 belongs (step S1303), thus ending a series of operations according to this flowchart. The mobile terminal device 101 then returns to the step invoking the table updating process.

At step S1301, if the ESSID is not registered (step S1301: NO), the updating unit 607 acquires the current date and time (step S1304). The updating unit 607 then adds a cell-ID, an ESSID, and the current date and time to the respective fields of the connection performance table 500 (step S1305) to end a series of operations according to this flowchart. The mobile terminal device 101 then returns to the step invoking the table updating process.

As a result, the storage contents of the connection performance table 500 can be updated. The cell-ID set at step S1305 is the cell-ID of the cell Ci to which the mobile device 101 belongs. The ESSID is the ESSID of an access point APj to which connection has been made.

A first communication control process procedure of the mobile terminal device 101 according to the first embodiment will be described.

Figure 14:
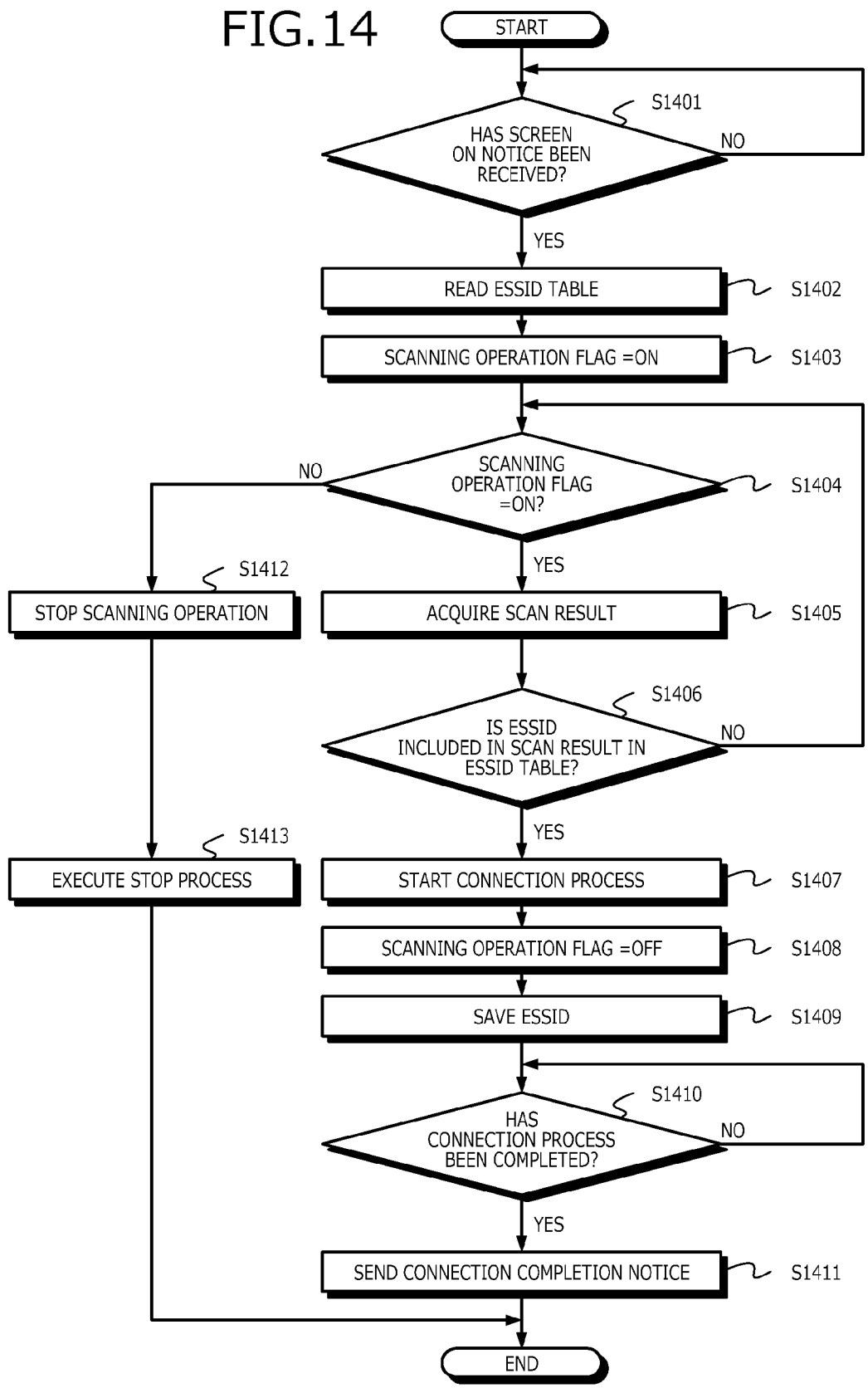
FIG. 14 is a flowchart of an example of a first communication control process procedure of the mobile terminal device 101 according to the first embodiment.

FIG. 14 is a flowchart of an example of the first communication control process procedure of the mobile terminal device 101 according to the first embodiment. In the flowchart depicted in FIG. 14, the communications control unit 606 first determines whether a screen ON notice has been received from the detecting unit 603 (step S1401).

At this time, the communications control unit 606 waits until a screen ON notice is received (step S1401: NO). When the communications control unit 606 has received a screen ON notice (step S1401: YES), the communications control unit 606 reads the ESSID table 400 (step S1402) and sets the scanning operation flag to ON (step S1403).

The communications control unit 606 then determines whether the scanning operation flag is ON (step S1404). If the flag is ON (step S1404: YES), the communications control unit 606 acquires a scan result from the second communications unit 602 (step S1405).

The communications control unit 606 then determines whether the ESSID included in the scan result is in the ESSID table 400 (step S1406). If the ESSID is not registered (step S1406: NO), the communications control unit 606 returns to step S1404.

On the other hand, if the ESSID is registered (step S1406: YES), the communications control unit 606 controls the second communications unit 602 to start a connection process to the access point APj (step S1407). The communications control unit 606 then sets the scanning operation flag to OFF (step S1408).

The communications control unit 606 saves the ESSID of the access point APj starting the connection process (step S1409) and determine whether the connection process to the access point APj has been completed (step S1410).

The communications control unit 606 waits until the completion of the connection process to the access point APj (step S1410: NO). When the connection process to the access point APj has been completed (step S1410: YES), the communications control unit 606 sends a connection completion notice to the updating unit 607 (step S1411) to end a series of operations according to this flowchart.

At step S1404, if the scanning operation flag is OFF (step S1404: NO), the communications control unit 606 controls the second communications unit 602 to stop the scanning operation for the access point APj (step S1412).

The communications control unit 606 then executes a stop process to stop the second communications unit 602 (step S1413), thus ending a series of operations according to this flowchart.

Consequently, the cyclic scanning operation for an access point APj can be started in response to the screen ON. Furthermore, in the case of the completion of connection to the access point APj, an interrupt of a connection completion notice can be generated.

A second communication control process procedure of the mobile terminal device 101 according to the first embodiment will be described.

Figure 15:
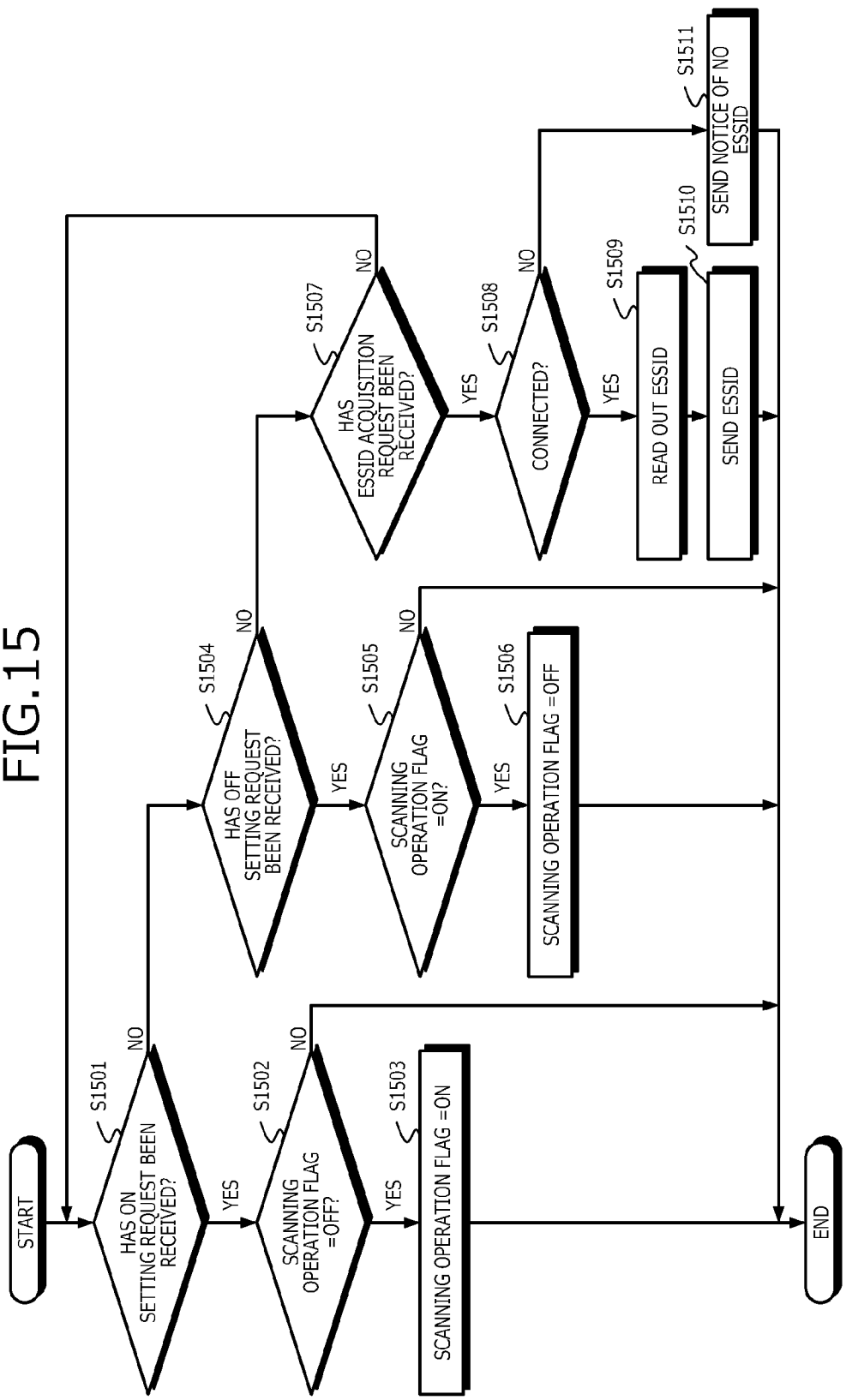
FIG. 15 is a flowchart of an example of a second communication control process procedure of the mobile terminal device 101 according to the first embodiment.

FIG. 15 is a flowchart of an example of the second communication control process procedure of the mobile terminal device 101 according to the first embodiment. In the flowchart depicted in FIG. 15, the communications control unit 606 first determines whether an ON setting request has been received from the determining unit 605 (step S1501).

If an ON setting request has been received (step S1501: YES), the communications control unit 606 determines whether the scanning operation flag is OFF (step S1502). If the scanning operation flag is ON (step S1502: NO), the communications control unit 606 terminates a series of operations according to this flowchart.

On the other hand, if the scanning operation flag is OFF (step S1502: YES), the communications control unit 606 sets the scanning operation flag to ON (step S1503) to end a series of operations according to this flowchart.

At step S1501, if an ON setting request has not been received (step S1501: NO), the communications control unit 606 determines whether an OFF setting request has been received from the determining unit 605 (step S1504).

If an OFF setting request has been received (step S1504: YES), the communications control unit 606 determines whether the scanning operation flag is ON (step S1505). If the scanning operation flag is OFF (step S1505: NO), the communications control unit 606 terminates a series of operations according to this flowchart.

On the other hand, if the scanning operation flag is ON (step S1505: YES), the communications control unit 606 sets the scanning operation flag to OFF (step S1506) to end a series of operations according to this flowchart.

At step S1504, if an OFF setting request has not been received (step S1504: NO), the communications control unit 606 determines whether an ESSID acquisition request has been received (step S1507). If an ESSID acquisition request has not been received (step S1507: NO), the communications control unit 606 returns to step S1501.

On the other hand, if an ESSID acquisition request has been received (step S1507: YES), the communications control unit 606 determines whether an access point APj has been connected to (step S1508). If connection to an access point APj has been made (step S1508: YES), the communications control unit 606 reads out from the memory 302, the ESSID of the access point APj to which connection has been made (step S1509).

The communications control unit 606 then sends the read ESSID to the sender of the ESSID acquisition request (step S1510), to end a series of operations according to this flowchart. If an access point APj has not been connected to (step S1508: NO), the communications control unit 606 sends no ESSID to the sender of the ESSID acquisition request (step S1511), to end a series of operations according to this flowchart.

Thus, the cyclic scanning operation for an access point APj can be controlled according to the presence or absence of connection to an access point APj in the cell Ci to which the mobile device 101 belongs.

A third determining process procedure will be described in a case where the scan timer is stopped when the display state of the display 303 transitions from display to non-display.

Figure 16:
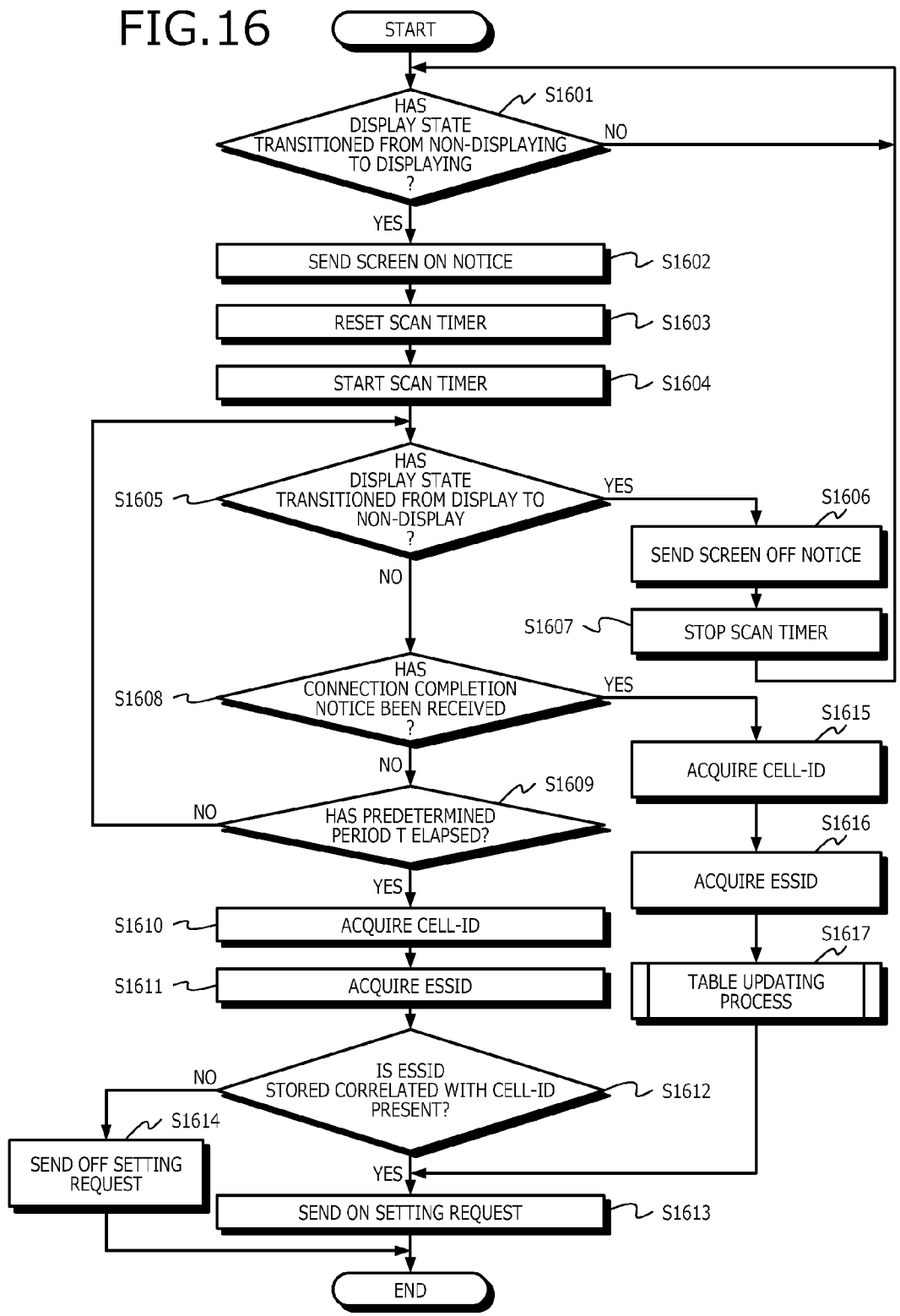
FIG. 16 is a flowchart of an example of a third determining process procedure of the mobile terminal device 101 according to the first embodiment.

FIG. 16 is a flowchart of an example of a third determining process procedure of the mobile terminal device 101 according to the first embodiment. In the flowchart depicted in FIG. 16, the detecting unit 603 determines whether the display state of the display 303 has transitioned from non-display to display (step S1601).

The detecting unit 603 waits for a transition from non-display to display in the display state of the display 303 (step S1601: NO). When the display state of the display 303 has transitioned from non-display to display (step S1601: YES), the detecting unit 603 sends a screen ON notice to the communications control unit 606 (step S1602).

The detecting unit 603 resets the scan timer (step S1603), and starts the scan timer (step S1604). The detecting unit 603 then determines whether the display state of the display 303 has transitioned from display to non-display (step S1605).

If the state of the display 303 has transitioned from display to non-display (step S1605: YES), the detecting unit 603 sends a screen OFF notice to the communications control unit 606 (step S1606). The detecting unit 603 stops the scan timer (step S1607) and returns to step S1601.

At step S1605, if the state of the display 303 has not transitioned from display to non-display (step S1605: NO), the updating unit 607 determines whether a connection completion notice has been received from the communications control unit 606 (step S1608). If a connection completion notice has not been received by the updating unit 607 (step S1608: NO), the determining unit 605 determines whether the predetermined period T has elapsed from the start of the scan timer (step S1609).

If the predetermined period T has not elapsed (step S1609: NO), the mobile terminal device 101 returns to step S1605. On the other hand, if the predetermined time has elapsed (step S1609: YES), the determining unit 605 requests the acquiring unit to acquire the cell-ID of the cell Ci to which the mobile device 101 belongs and thereby, acquires the cell-ID of the cell Ci to which the mobile device 101 belongs (step S1610).

The determining unit 605 then requests the communications control unit 606 to acquire the ESSID of the access point APj to which connection has been made and thereby acquires the ESSID of the access point APj to which connection has been made (step S1611). The determining unit 605 refers to the connection performance table 500 and determines whether an ESSID stored correlated with the cell-ID of the cell Ci to which the mobile device 101 belongs is registered (step S1612).

If an ESSID is registered (step S1612: YES), the determining unit 605 sends an ON setting request for the scanning operation flag to the communications control unit 606 (step S1613), and ends a series of operations according to this flowchart.

On the other hand, if no ESSID is registered (step S1612: NO), the determining unit 605 sends an OFF setting request of the scanning operation flag to the communications control unit 606 (step S1614), and ends a series of operations according to this flowchart.

If a connection completion notice has been received from the communications control unit 606 (step S1608: YES), the updating unit 607 requests the acquiring unit 604 to acquire the cell-ID of the cell Ci to which the mobile device 101 belongs and thereby, acquires the cell-ID of the cell Ci to which the mobile device 101 belongs (step S1615).

The updating unit 607 then requests the communications control unit 606 to acquire the ESSID of the access point APj to which connection has been made and thereby, acquires the ESSID of the access point APj to which connection has been made (step S1616). The updating unit 607 then executes a table updating process (step S1617), and ends a series of operations according to this flowchart.

Accordingly, the scan timer can be stopped in response to the screen OFF so that in the state of the screen OFF, the process of determining whether connection to an access point APj has been performed cannot be performed after the elapse of the predetermined period T from the screen ON.

A third communication control process procedure of the mobile terminal device 101 will be described in a case of a transition from display to non-display in the display state of the display 303.

Figure 17:
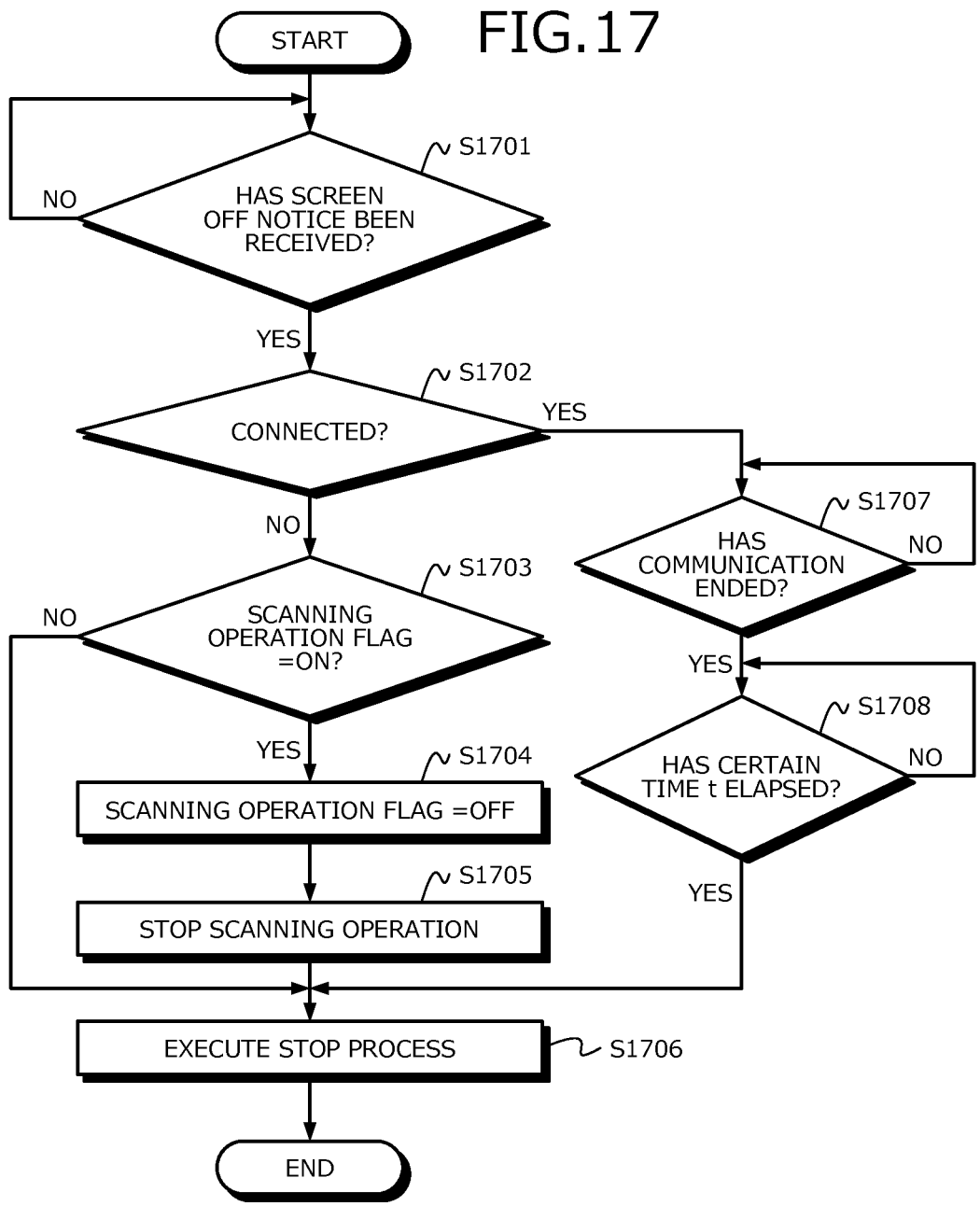
FIG. 17 is a flowchart of an example of a third communication control process procedure of the mobile terminal device 101 according to the first embodiment.

FIG. 17 is a flowchart of an example of the third communication control process procedure of the mobile terminal device 101 according to the first embodiment. In the flowchart depicted in FIG. 17, the communications control unit 606 first determines whether a screen OFF notice has been received from the detecting unit 603 (step S1701).

The communications control unit 606 waits until a screen OFF notice is received from the detecting unit 603 (step S1701: NO). When a screen OFF notice has been received (step S1701: YES), the communications control unit 606 determines whether connection to an access point APj has been made (step S1702).

If connection to access point APj has not been made (step S1702: NO), the communications control unit 606 determines whether the scanning operation flag is ON (step S1703). If the scanning operation flag is OFF (step S1703: NO), the communications control unit 606 goes to step S1706. On the other hand, if the scanning operation flag is ON (step S1703: YES), the communications control unit 606 sets the scanning operation flag to OFF (step S1704).

The communications control unit 606 controls the second communications unit 602 to stop the scanning operation for an access point APj (step S1705). The communications control unit 606 executes a stop process to stop the second communications unit 602 (step S1706), ending a series of operations according to this flowchart.

If connection to an access point APj has been made at step S1702 (step S1702: YES), the communications control unit 606 determines whether communication via the access point APj has ended (step S1707). The communications control unit 606 waits the communication via the access point APj ends (step S1707: NO).

When the communication via the access point APj has ended (step S1707: YES), the communications control unit 606 determines whether a certain time t has elapsed since the ending of the communication via the access point APj (step S1708). The communications control unit 606 waits until the certain time t has elapsed (step S1708: NO).

When the certain time t has elapsed (step S1708: YES), the communications control unit 606 executes the stop process to stop the second communications unit 602 (step S1706), ending a series of operations according to this flowchart.

Thus, the cyclic scanning operation of the access point APj can be stopped in response to a screen OFF. The elapsed time from the ending of the communication via the access point APj can be measured by a timer for example.

As described above, according to the mobile terminal device 101 of the first embodiment, the scanning operation for an access point APj can be started when a transition from non-display to display in the display state of the display 303 occurs. Thus, the screen ON can trigger a search for an available access point APj without user operation input, thereby preventing drops in usability.

The mobile terminal device 101 enables determination of whether connection to an access point APj in the cell Ci to which the mobile device 101 belongs has been performed, after the elapse of the predetermined period T from the transition from non-display to display in the display state of the display 303.

The mobile terminal device 101 enables the scanning operation for the access point APj to be continued when it has been determined that connection to an access point APj has been performed after the elapse of the predetermined period T from the transition from non-display to display in the display state of the display 303. This enables the scanning operation to be continued when the mobile terminal device 101 belongs to a cell Ci with a higher possibility of having an available access point APj as compared with a cell Ci in which connection has not been performed, even in a case of non-connection to the access point APj after the elapse of the predetermined period T. This results in a higher re-connectivity to an access point APj, preventing drops in usability.

According to the mobile terminal device 101, the scanning operation of the access point APj can be stopped when it is determined that connection to the access point APj has not been performed after the elapse of the predetermined period T from the transition from non-display to display in the display state of the display 303. Thus, the scanning operation can be stopped when the mobile terminal device 101 belongs to a cell Ci with a lower possibility of having an available access point APj as compared with a cell Ci in which connection has been performed after the elapse of the predetermined period T. As a result, the power consumed for the scanning operation for an access point APj can be suppressed.

According to the mobile terminal device 101, the scanning operation for an access point APj can be stopped when the display state of the display 303 transitions from display to non-display as result of start of the scanning operation of the access point APj. This suppresses the scanning operation for an access point APj when the display state of the display 303 is non-display so that the power consumed by the mobile terminal device 101 can be suppressed.

According to the mobile terminal device 101, even when the mobile terminal device 101 belongs to a cell Ci in which connection to an access point APj has not been performed at the time of a screen ON, the scanning operation can be started in response to the screen ON. Thus, if an access point APj given the same ESSID as that of an available access point APj is present around the mobile terminal device 101, the connection to the network 210 can be achieved via the access point APj.

According to the mobile terminal device 101, when new connection performance information is registered into the connection performance table 500, it can be determined whether the sum of the connection performance information records registered in the connection performance table 500 is not less than a threshold value $M_{max}$. According to the mobile terminal device 101, when the sum M is not less than the threshold value $M_{max}$, connection performance information having the oldest connection time can be deleted from among connection performance information registered in the connection performance table 500. This can suppress an increase in the number of records in the connection performance table 500, thereby achieving a suppression of increases in the storage area used for the storage of the connection performance table 500.

From the above, according to the mobile terminal device 101 of the first embodiment, the power consumed for the scanning operation for an access point APj can be suppressed and drops in usability can be prevented.

The mobile terminal device 101 according to a second embodiment will now be described. Parts identical to those described in the first embodiment will not again be described.

Although in the first embodiment a case has been described where the scan timer is used to determine whether the predetermined period T has elapsed, description of the second embodiment is given of a case where it is determined whether the predetermined period T has elapsed by the number of times of the scanning operation for an access point APj has been performed.

Figure 18:
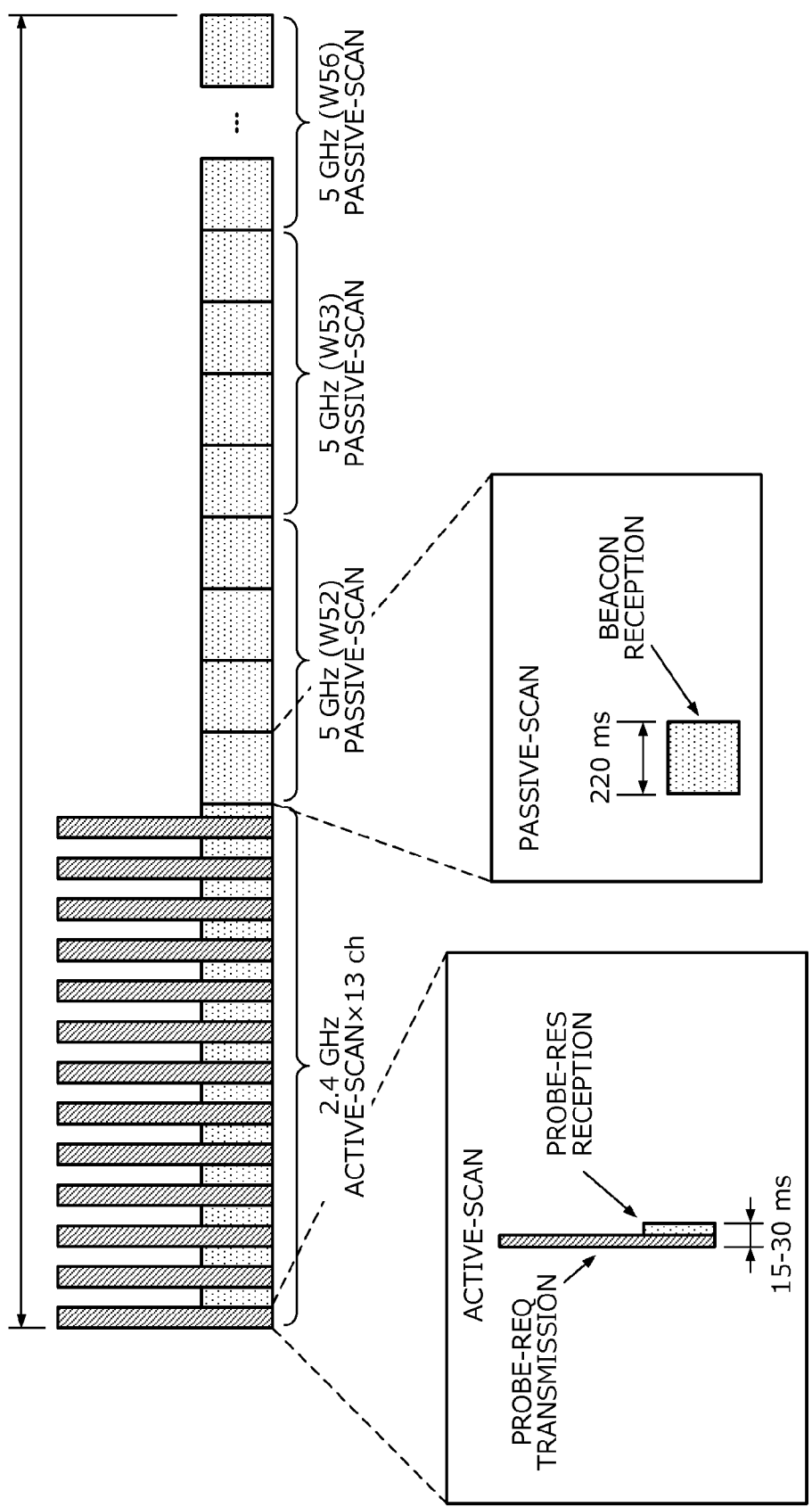
FIG. 18 is an explanatory diagram of an example of a scanning operation for an access point APj.

A general operation example of the scanning operation for an access point APj will first be described. FIG. 18 is an explanatory diagram of an example of the scanning operation for an access point APj. As depicted in FIG. 18, the scanning operation includes an active scan and a passive scan.

The active scan is a scanning operation of detecting an access point APj by sending a probe request signal to channels used in the wireless LAN and receiving a probe response signal. In the active scan, a frequency band of 2.4 GHz, for example, is used.

For example, the channels of the wireless LAN used for the active scan are 13 channels with a frequency band of 2.4 GHz specified in 802.11 of the Institute of Electrical and Electronics Engineers, Inc. (IEEE).

The passive scan is a scanning operation of detecting an access point APj by receiving a signal (packet) called beacon from the access point APj. In the passive scan, a frequency band of 5 GHz, for example, is used. For example, the wireless LAN channels used for the passive scan are W52 (type) 4 channels, W53(type) 4 channels, or W56 (type) 11 channels specified in IEEE802.11.

The time consumed for the active scan of 1 channel is on the order of 15 to 30 ms, for example. The time consumed for the passive scan of 1 channel is on the order of 220 ms, for example. This is a period that ensures receipt of the beacon two times since the beacon transmission cycle from the access point APj is approx. 102.4 ms.

A functional configuration example of the mobile terminal device 101 according to the second embodiment will be described. The functional configuration of the mobile terminal device 101 according to the second embodiment is similar to the functional configuration of the mobile terminal device 101 according to the first embodiment and therefore will not be depicted. Functional units having different process contents from those of the mobile terminal device 101 described in the first embodiment will be described.

The determining unit 605 determines whether the scanning operation for an access point APj has been performed a predetermined number of times F after the transition from non-display to display in the display state of the display 303. If the scanning operation has been performed the predetermined number of times F, the determining unit 605 refers to the connection performance table 500 and determines whether the ESSID of an access point APj stored correlated with the cell-ID of the cell Ci to which the mobile device 101 belongs is registered.

If the ESSID of such an access point APj is registered, the determining unit 605 determines that connection to the access point APj in the cell Ci to which the mobile device 101 belongs has been performed. On the other hand, if the ESSID of such an access point APj is not registered, the determining unit 605 determines that no connection to an access point APj in the cell Ci to which the mobile device 101 belongs has been performed.

The predetermined number of times F is arbitrarily set and, for example, is set under the assumption that the mobile terminal device 101 may not be able to find a nearby access point APj by a single scanning operation. For example, the predetermined number of times is 3 (times) or 5 (times) and is stored in the memory 302.

The mobile terminal device 101 may perform either the operation of the active scan or the passive scan as the scanning operation of the access point APj; or may perform both operations of the active scan and the passive scan.

An operation example of the mobile terminal device 101 according to the second embodiment will be described with reference to FIG. 19.

Figure 19:
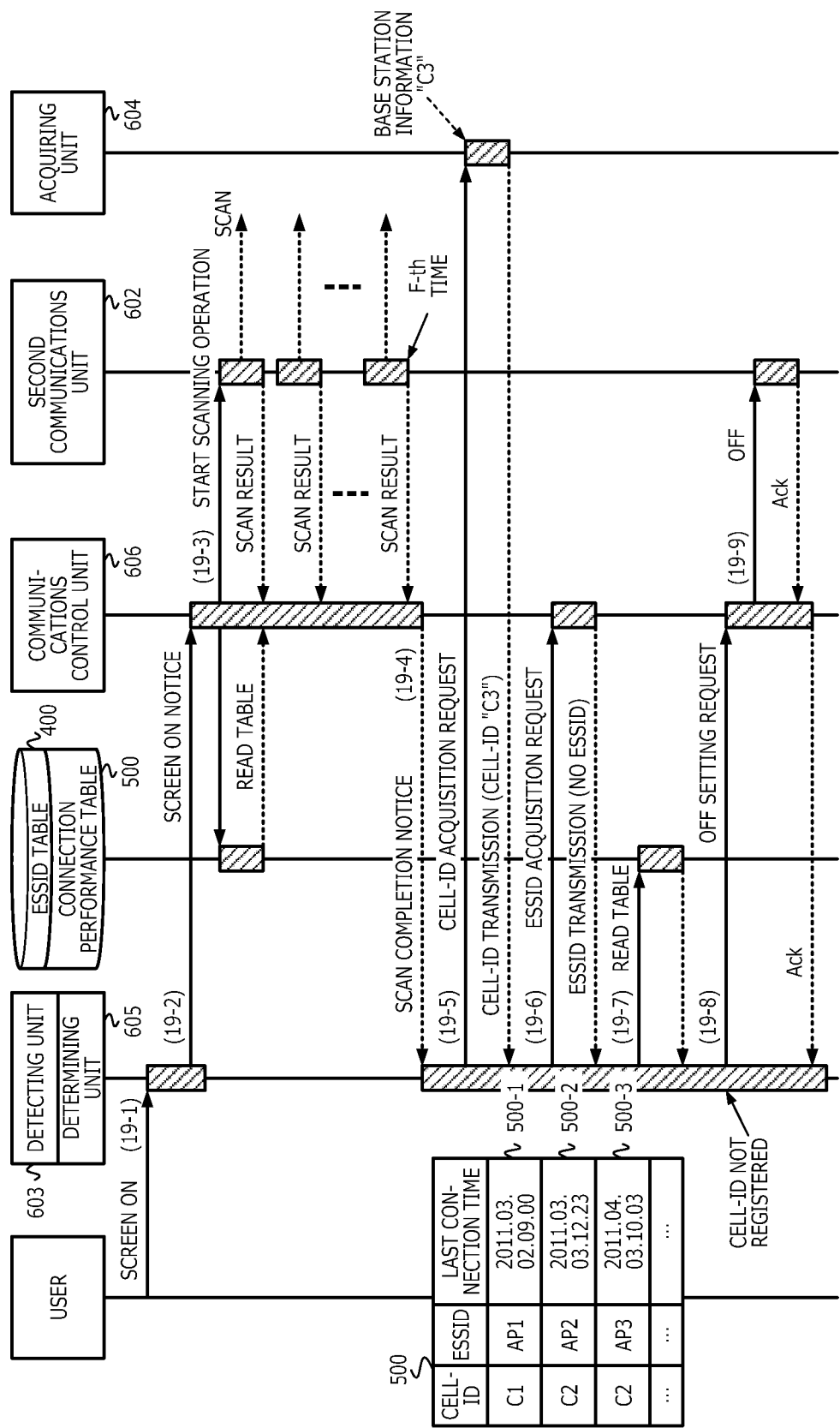
FIG. 19 is an explanatory diagram of an operation example of the mobile terminal device 101 according to a second embodiment.

FIG. 19 is an explanatory diagram of an operation example of the mobile terminal device 101 according to the second embodiment. The operation example of the mobile terminal device 101 depicted in FIG. 19 is an operation example in a case when connection to an access point APj in the cell Ci to which the mobile device 101 belongs has not been performed.

(19-1) The detecting unit 603 detects that the display state of the display 303 has transitioned from non-display to display. In the example depicted in FIG. 19, a transition from non-display to display in the display state of the display 303 is detected as a result of a changing of the display state of the display 303 from non-display to display by user operation input.

(19-2) If the detecting unit 603 detects a transition from non-display to display in the display state of the display 303, the detecting unit 603 sends a screen ON notice to the communications control unit 606.

(19-3) When receiving the screen ON notice, the communications control unit 606 controls the second communications unit 602 to start a scanning operation for an access point APj. The communications control unit 606 reads the ESSID table 400 to determine whether the ESSID included in the scan result from the second communications unit 602 is in the ESSID table 400.

If the ESSID is registered, the communications control unit 606 controls the second communications unit 602 to start the operation of connecting to the access point APj. On the other hand, if the ESSID is not registered, the communications control unit 606 does not start the operation of connecting to the access point APj. In the example depicted in FIG. 19, the ESSID of the access point APj found by a scanning operation is not in the ESSID table 400 and therefore, the operation of connecting to an access point APj is not started.

(19-4) If the operation of scanning for an access point APj has been performed a predetermined number of times F, the communications control unit 606 sends a scan completion notice to the determining unit 605. The scan completion notice indicates that the operation of scanning for an access point APj has been performed the predetermined number of times F.

(19-5) When receiving the scan completion notice from the communications control unit 606, the determining unit 605 requests the acquiring unit 604 to acquire the cell-ID of the cell Ci to which the mobile device 101 belongs and thereby, acquires the cell-ID of the cell Ci to which the mobile device 101 belongs. In the example depicted in FIG. 19, the cell-ID "C3" of the cell C3 to which the mobile device 101 belongs is acquired.

(19-6) The determining unit 605 requests the communications control unit 606 to acquire the ESSID of the access point APj to which connection has been made and thereby, acquires the ESSID of the access point APj to which connection has been made. In the example depicted in FIG. 19, "no ESSID" indicative of no connection to an access point APj is sent from the communications control unit 606 to the determining unit 605.

(19-7) The determining unit 605 reads the connection performance table 500 and determines whether connection to an access point APj in the cell Ci to which the mobile device 101 belongs has been performed. In the example depicted in FIG. 19, connection performance information corresponding to the acquired cell-ID "C3" has not been registered and therefore, it is determined that connection to an access point APj has not been performed.

(19-8) The determining unit 605 sends to the communications control unit 606, an OFF setting request for the scanning operation flag.

(19-9) When receiving the scanning operation flag OFF setting request, the communications control unit 606 returns an Ack to the determining unit 605 and, if the scanning operation flag is ON, sets the scanning operation flag to OFF.

This results in a suspension of the cyclic scanning operation for an access point APj performed by the second communications unit 602.

In this manner, according to the mobile terminal device 101, the cyclic scanning operation for an access point APj can be started in response to a screen ON. In the case of non-connection to an access point APj despite the execution of the scanning operation for an access point APj up to the predetermined number of times F, the cyclic scanning operation of the access point APj can be stopped.

Various process procedures of the mobile terminal device 101 according to the second embodiment will be described. A determination process procedure of the mobile terminal device 101 will be described in which it is determined whether connection to an access point APj in the cell Ci to which the mobile terminal device 101 belongs has been performed.

Figure 20:
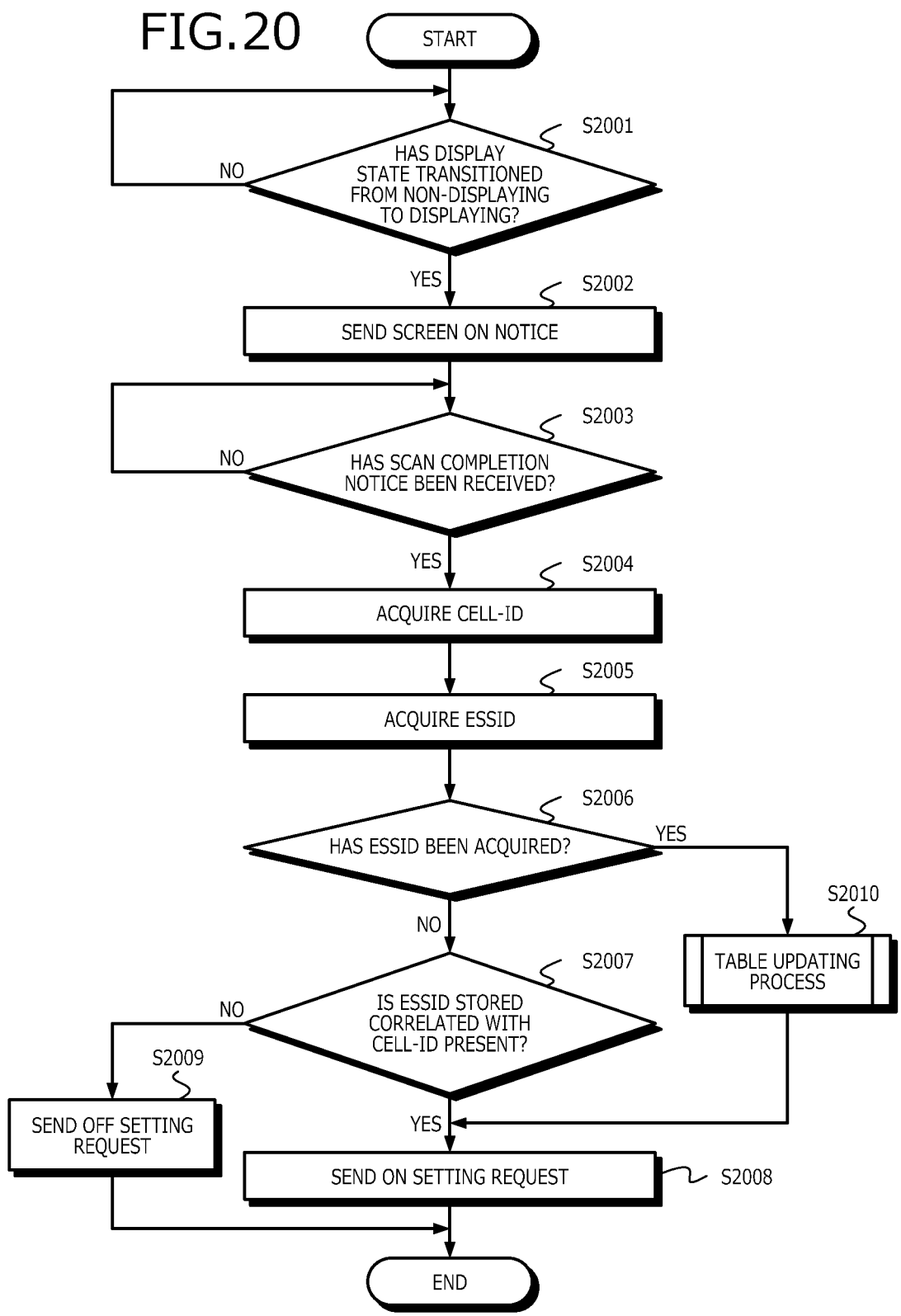
FIG. 20 is a flowchart of an example of a determining process procedure of the mobile terminal device 101 according to the second embodiment.

FIG. 20 is a flowchart of an example of a determining process procedure of the mobile terminal device 101 according to the second embodiment. In the flowchart depicted in FIG. 20, the detecting unit 603 determines whether the display state of the display 303 has transitioned from non-display to display (step S2001).

The detecting unit 603 waits for a transition from non-display to display in the display state of the display 303 (step S2001: NO). When the display state of the display 303 has transitioned from non-display to display (step S2001: YES), the detecting unit 603 sends a screen ON notice to the communications control unit 606 (step S2002).

The determining unit 605 then determines whether a scan completion notice has been received from the communications control unit 606 (step S2003). Here, the determining unit 605 waits until a scan completion notice has been received (step S2003: NO).

When a scan completion notice has been received (step S2003: YES), the determining unit 605 requests the acquiring unit 604 to acquire the cell-ID of the cell Ci to which the mobile device 101 belongs and thereby, acquires the cell-ID of the cell Ci to which the mobile device 101 belongs (step S2004).

The determining unit 605 then requests the communications control unit 606 to acquire the ESSID of the access point APj to which connection has been made and thereby, acquires the ESSID of the access point APj to which connection has been made (step S2005). The determining unit 605 then determines whether the ESSID of the access point APj to which connection has been made has been acquired (step S2006).

If the ESSID has not been acquired (step S2006: NO), the determining unit 605 refers to the connection performance table 500 and determines whether an ESSID stored correlated with the cell-ID to which the mobile device 101 belongs is registered (step S2007).

If an ESSID is registered (step S2007: YES), the determining unit 605 sends an ON setting request for the scanning operation flag to the communications control unit 606 (step S2008), and ends a series of operations according to this flowchart.

On the other hand, if no ESSID is registered (step S2007: NO), the determining unit 605 sends an OFF setting request for the scanning operation flag to the communications control unit 606 (step S2009), and ends a series of operations according to this flowchart.

At step S2006, if the ESSID has been acquired (step S2006: YES), the updating unit 607 executes a table updating process (step S2010), and ends a series of operations according to this flowchart.

As a result, it can be determined whether connection to an access point APj in the cell Ci to which the mobile device 101 belongs has been performed, after the execution of the scanning operation of the access point APj by the predetermined number of times F from the screen ON. In the case of non-connection to an access point APj despite the execution of the scanning operation up to the predetermined number of times F, the cyclic scanning operation of the access point APj can be controlled according to whether connection to an access point APj in the cell Ci to which the mobile device 101 belongs has been performed. A specific process procedure of a table updating process at step S2010 is similar to the specific process procedure of the table updating process depicted in FIG. 13 and therefore, will not again be described.

A communication control process procedure of the mobile terminal device 101 according to the second embodiment will be described.

Figure 21:
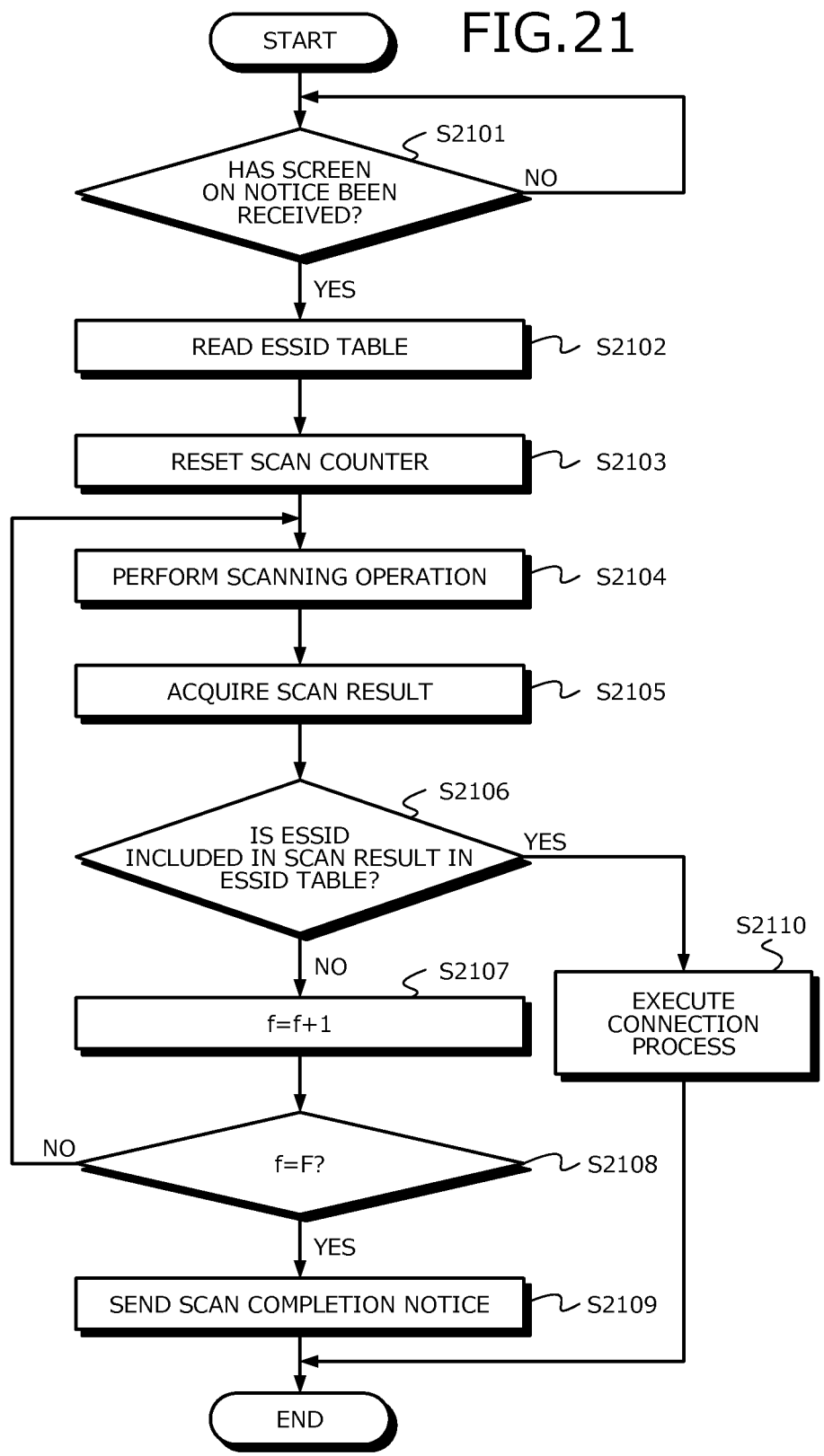
FIG. 21 is a flowchart of an example of the first communication control process procedure of the mobile terminal device 101 according to the second embodiment.

FIG. 21 is a flowchart of an example of the first communication control process procedure of the mobile terminal device 101 according to the second embodiment. In the flowchart depicted in FIG. 21, the communications control unit 606 first determines whether a screen ON notice has been received from the detecting unit 603 (step S2101).

At this time, the communications control unit 606 waits until a screen ON notice is received (step S2101: NO). When the communications control unit 606 has received a screen ON notice (step S2101: YES), the communications control unit 606 reads the ESSID table 400 (step S2102).

The communications control unit 606 then resets a scan counter f (step S2103). The scan counter f is a counter that counts the number of times that the scanning operation for an access point APj has been performed. The scan counter f is realized by, for example, the memory 302 or a register of the CPU 301.

The communications control unit 606 controls the second communications unit 602 to perform a scanning operation for an access point APj (step S2104). The communications control unit 606 acquires a scan result from the second communications unit 602 (step S2105).

The communications control unit 606 determines whether the ESSID included in the scan result is in the ESSID table 400 (step S2106). If the ESSID is not registered (step S2106: NO), the communications control unit 606 increments the scan counter f (step S2107).

The communications control unit 606 determines whether "f" of the scan counter f has reached "F" of the predetermined number of times F (step S2108). If "f" has not reached "F" (step S2108: NO), the communications control unit 606 returns to step S2104.

On the other hand, if "f" has reached "F" (step S2108: YES), the communications control unit 606 sends a scan completion notice to the determining unit 605 (step S2109), ending a series of operations according to this flowchart.

At step S2106, if the ESSID is registered (step S2106: YES), the communications control unit 606 executes the connection process of connecting to the access point APj (step S2110), ending a series of operations according to this flowchart.

Accordingly, the scanning operation of the access point APj can be performed a predetermined number of times F in response to the screen ON. In the case of execution of the scanning operation of the access point APj the predetermined number of times F, a scan completion notice can be sent to the determining unit 605.

As described above, according to the mobile terminal device 101 of the second embodiment, it can be determined whether the scanning operation for an access point APj has been performed the predetermined number of times F after a transition from non-display to display in the display state of the display 303. According to the mobile terminal device 101, in the case of execution of the scanning operation for an access point APj the predetermined number of times F, it can be determined whether connection to an access point APj in the cell Ci to which the mobile device 101 belongs has been performed.

Thus, without providing the scan timer, etc., on the mobile terminal device 101, the scanning operation for an access point APj can be controlled by determining whether connection to an access point APj has been performed after the elapse of the predetermined time from the screen ON.

A mobile terminal device 101 according to a third embodiment will be described. Parts identical to those described in the first and the second embodiments will not again be described.

In the first embodiment, description has been given of a case where it is determined whether connection to an access point APj has been performed after the elapse of the predetermined period T from a screen ON so that the scanning operation for an access point APj is controlled based on the determination result. In the third embodiment, description will be given of a case where it is determined whether connection to an access point APj has been performed at the time of a screen ON so that after the elapse of the predetermined period T, the scanning operation for an access point APj is controlled based on the determination result.

An operation example of the mobile terminal device 101 according to the third embodiment will be described with reference to FIGS. 22 to 24.

Figure 22:
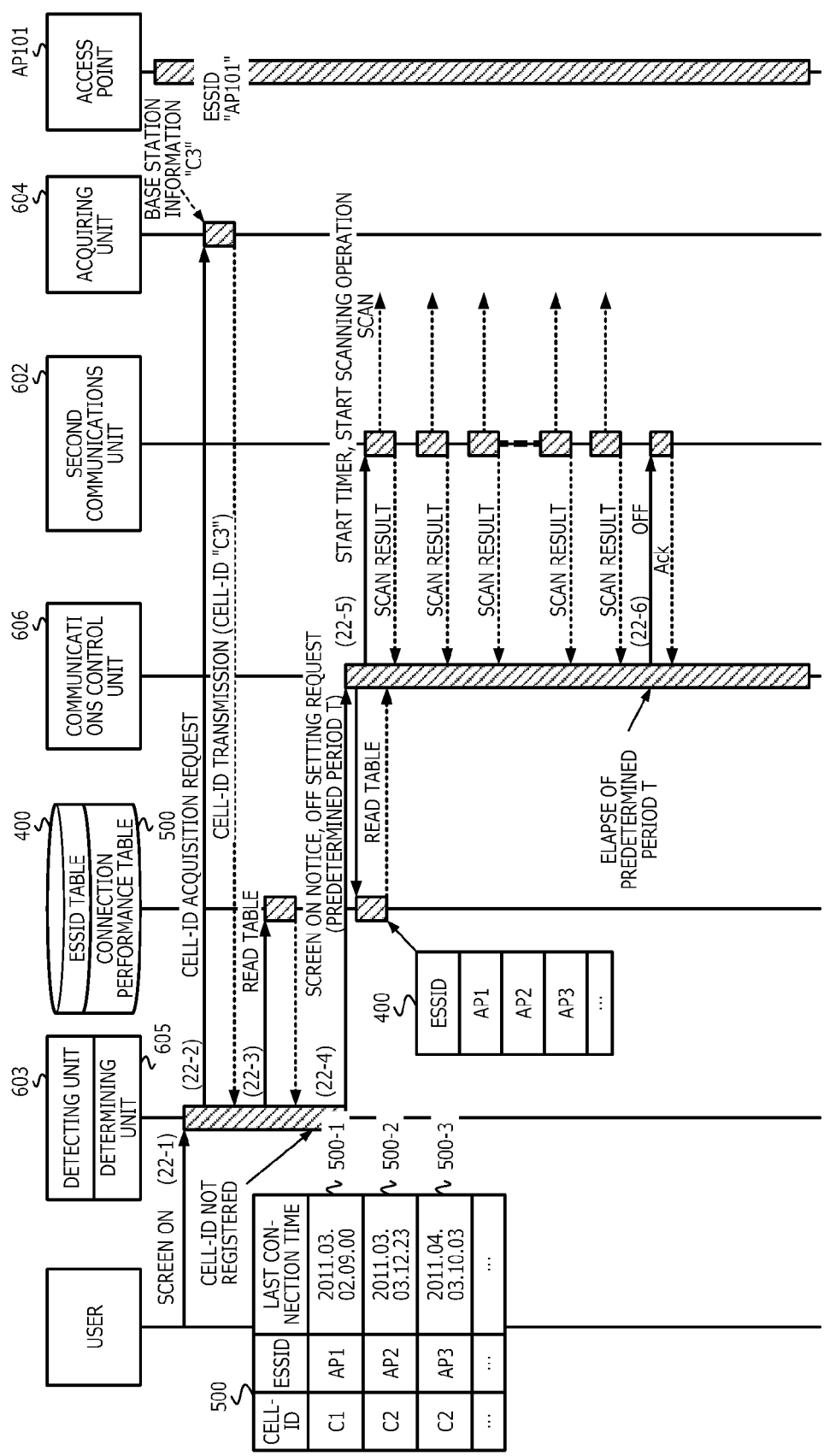
FIG. 22 is an explanatory diagram (part 1) of an operation example of the mobile terminal device 101 according to a third embodiment.

FIG. 22 is an explanatory diagram (part 1) of an operation example of the mobile terminal device 101 according to the third embodiment. The operation example of the mobile terminal device 101 depicted in FIG. 22 is an operation example in the case in which connection to an access point APj in the cell Ci to which the mobile device 101 belongs has been performed.

(22-1) The detecting unit 603 detects that the display state of the display 303 has transitioned from non-display to display. In the example of FIG. 22, a transition from non-display to display in the display state of the display 303 is detected as a result of a changing of the display state of the display 303 from non-display to display by user operation input.

(22-2) When a transition from non-display to display in the display state of the display 303 is detected, the determining unit 605 requests the acquiring unit 604 to acquire the cell-ID of the cell Ci to which the mobile device 101 belongs and thereby, acquires the cell-ID of the cell Ci to which the mobile device 101 belongs. In the example depicted in FIG. 22, the cell-ID "C3" of the cell C3 to which the mobile device 101 belongs is acquired.

(22-3) The determining unit 605 reads the connection performance table 500 and determines whether connection to an access point APj in the cell Ci to which the mobile device 101 belongs has been performed. In the example depicted in FIG. 22, connection performance information corresponding to the acquired cell-ID "C3" is not registered and therefore, it is determined that connection to an access point APj has not been performed.

(22-4) In the case of no connection performance, the determining unit 605 sends to the communications control unit 606, a screen ON notice and an OFF setting request (predetermined period T) requesting that the scanning operation flag be turned OFF after the elapse of the predetermined period T.

(22-5) When receiving the screen ON notice and the OFF setting request (predetermined period T), the communications control unit 606 starts the scan timer and controls the second communications unit 602 to start a detecting operation for an access point APj.

The communications control unit 606 reads the ESSID table 400 and determines whether the ESSID included in the scanning result from the second communications unit 602 is in the ESSID table 400. If the ESSID is registered, the communications control unit 606 controls the second communications unit 602 to start the operation of connecting to the access point APj. On the other hand, if the ESSID is not registered, the communications control unit 606 does not start the operation of connecting to an access point APj. In the example depicted in FIG. 22, the ESSID "Ap101" of the access point aP101 found by the scanning operation is not in the ESSID table 400 and therefore, the operation of connecting to an access point APj is not started.

(22-6) If the scanning operation flag is ON after the elapse of the predetermined period T from the start of the scan timer, the communications control unit 606 sets the scanning operation flag to OFF. As a result, the cyclic scanning operation for an access point APj performed by the second communications unit 602 is discontinued.

In this manner, according to the mobile terminal device 101, the screen ON can trigger a determination of whether connection to an access point APj in the cell Ci to which the mobile device 101 belongs has been performed and a start of the cyclic scanning operation for an access point APj. In the case of no connection to an access point APj despite the elapse of the predetermined period T from the screen ON, the cyclic scanning operation of the access point APj can be discontinued.

Figure 23:
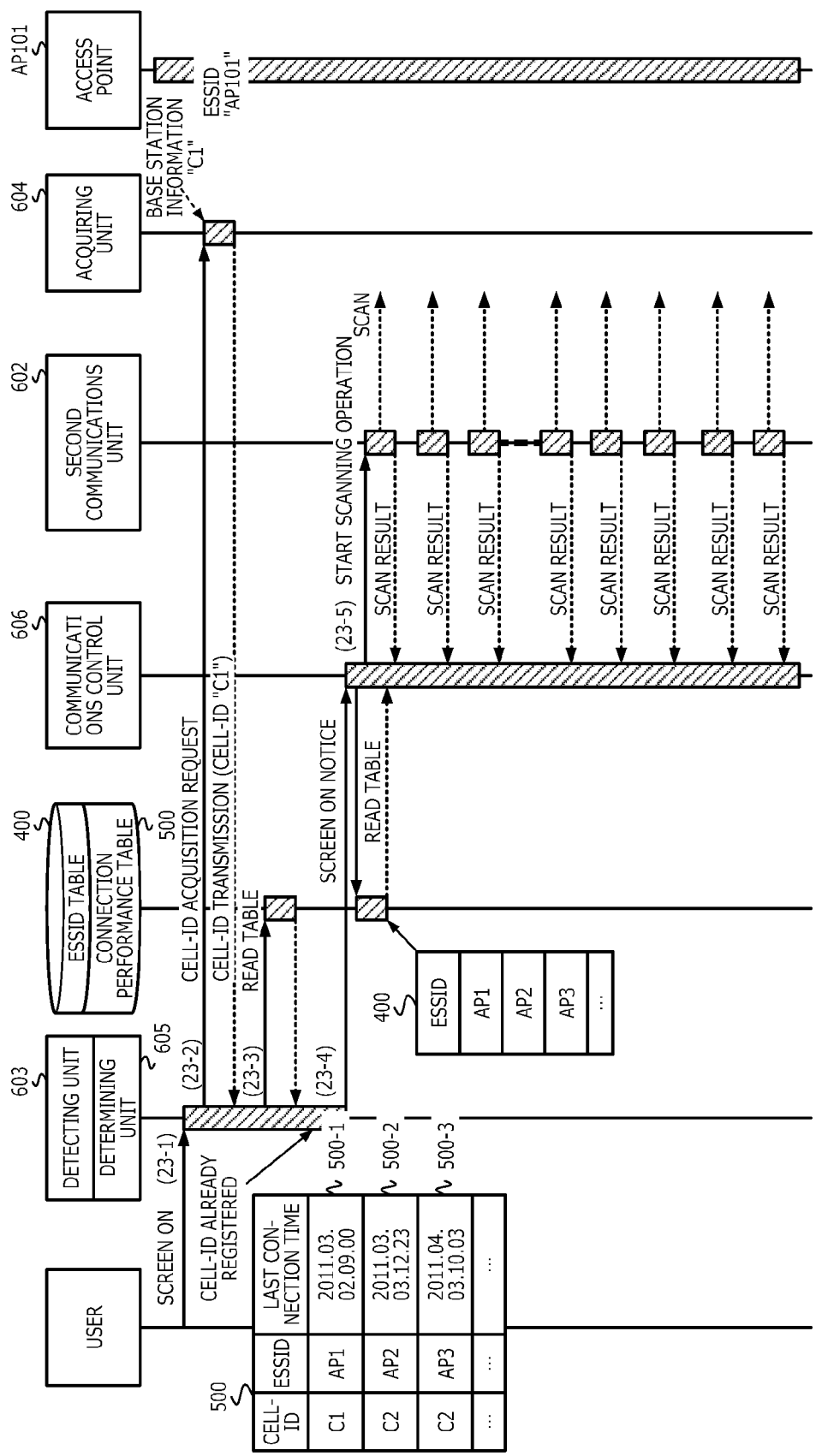
FIG. 23 is an explanatory diagram (part 2) of an operation example of the mobile terminal device 101 according to the third embodiment.

FIG. 23 is an explanatory diagram (part 2) of an operation example of the mobile terminal device 101 according to the third embodiment. The operation example of the mobile terminal device 101 depicted in FIG. 23 is an operation example of a case where connection to an access point APj in the cell to which the mobile device 101 belongs has been performed.

(23-1) The detecting unit 603 detects that the display state of the display 303 has transitioned from non-display to display. In the example depicted in FIG. 23, it is detected that the display state of the display 303 has transitioned from non-display to display as a result of a changing of the display state of the display 303 from non-display to display by user operation input.

(23-2) When the display state of the display 303 has been detected to have transitioned from non-display to display, the determining unit 605 requests the acquiring unit 604 to acquire the cell-ID of the cell Ci to which the mobile device 101 belongs and thereby, acquires the cell-ID of the cell Ci to which the mobile device 101 belongs. In the example depicted in FIG. 23, the cell-ID "C1" of the cell C1 to which the mobile device 101 belongs is acquired.

(23-3) The determining unit 605 reads the connection performance table 500 and determines whether connection to an access point APj in the cell Ci to which the mobile device 101 belongs has been performed. In the example depicted in FIG. 23, connection performance information corresponding to the acquired cell-ID "C1" has already been registered and therefore, connection to the access point APj is determined to have been performed.

(23-4) If connection has been performed, the determining unit 605 sends a screen ON notice to the communications control unit 606.

(23-5) When receiving the screen ON notice, the communications control unit 606 controls the second communications unit 602 to start the scanning operation for an access point APj.

The communications control unit 606 reads the ESSID table 400 to determine whether the ESSID included in the scan result from the second communications unit 602 is in the ESSID table 400. If the ESSID is registered, the communications control unit 606 controls the second communications unit 602 to start the operation of connecting to the access point APj. On the other hand, if the ESSID is not registered, the communications control unit 606 does not start the operation of connecting to an access point APj. In the example depicted in FIG. 23, the ESSID "AP101" of the access point aP101 found by the scanning operation is not in the ESSID table 400 and therefore, the operation of connecting to an access point APj is not started.

In this manner, according to the mobile terminal device 101, the screen ON can trigger a determination of whether connection to an access point APj in the cell Ci to which the mobile device 101 belongs has been performed and a start of the cyclic scanning operation for an access point APj. Even in the case of no connection to an access point APj after the elapse of the predetermined period T from the screen ON, the cyclic scanning operation of the access point APj can be continued if connection to an access point APj in the cell Ci to which the mobile device 101 belongs has been performed.

Figure 24:
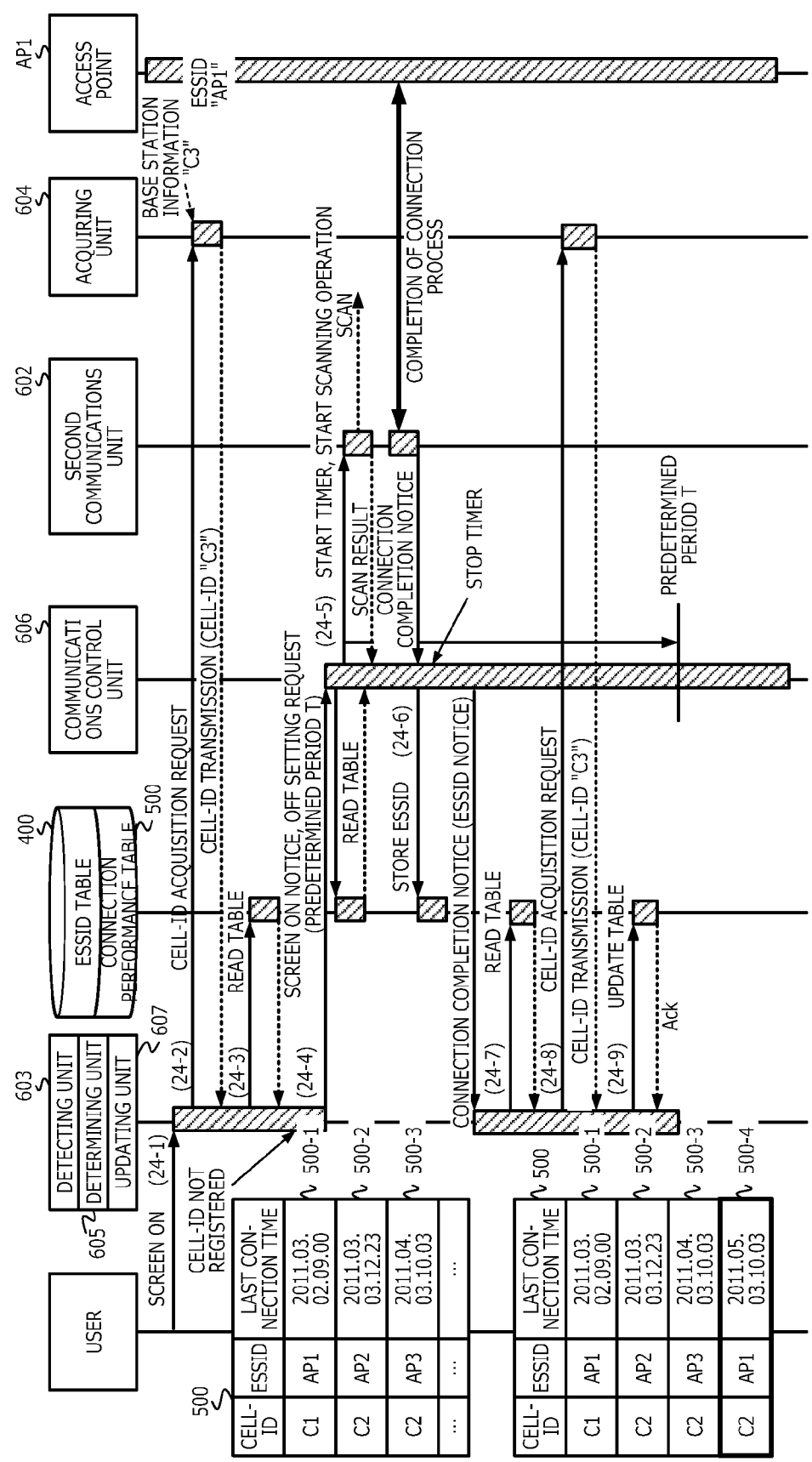
FIG. 24 is an explanatory diagram (part 3) of an operation example of the mobile terminal device 101 according to the third embodiment.

FIG. 24 is an explanatory diagram (part 3) of an operation example of the mobile terminal device 101 according to the third embodiment. The operation example of the mobile terminal device 101 depicted in FIG. 24 is an operation example of a case where the updating unit 607 receives a connection completion notice (an interrupt notice) from the communications control unit 606 as a result of completion of connection to an access point APj during the cyclic scanning operation of the access point APj.

(24-1) The detecting unit 603 detects that the display state of the display 303 has transitioned from non-display to display. In the example depicted in FIG. 24, it is detected that the display state of the display 303 has transitioned from non-display to display as a result of switching the display state of the display 303 from non-display to display by user operation input.

(24-2) When the display state of the display 303 has been detected to have transitioned from non-display to display, the determining unit 605 requests the acquiring unit 604 to acquire the cell-ID of the cell Ci to which the mobile device 101 belongs and thereby, acquires the cell-ID of the cell Ci to which the mobile device 101 belongs. In the example depicted in FIG. 24, the cell-ID "C3" of the cell C3 to which the mobile device 101 belongs is acquired.

(24-3) The determining unit 605 reads the connection performance table 500 and determines whether connection to an access point APj in the cell Ci to which the mobile device 101 belongs has been performed. In the example depicted in FIG. 24, connection performance information corresponding to the acquired cell-ID "C3" is not registered and therefore, connection to an access point APj is determined to not have been performed.

(24-4) If connection has not been performed, the determining unit 605 sends to the communications control unit 606, a screen ON notice and an OFF setting request (predetermined period T) requesting that the scanning operation flag be turned OFF after the elapse of the predetermined period T.

(24-5) When receiving the screen ON notice and the OFF setting request (predetermined period T), the communications control unit 606 starts the scan timer and controls the second communications unit 602 to start the detecting operation for an access point APj.

If the ESSID included in the scan result from the second communications unit 602 is in the ESSID table 400, the communications control unit 606 controls the second communications unit 602 to start the operation of connecting to the access point APj.

In the example depicted in FIG. 24, the ESSID "AP1" of the access point aP1 found by the scanning operation is already registered and therefore, the operation of connecting to the access point APj is started.

(24-6) When receiving a connection completion notice from the second communications unit 602, the communications control unit 606 stores the ESSID of the connection-completed access point aP1 into the memory 302 and sends a connection completion notice to the updating unit 607. The connection completion notice includes the ESSID of the connection-completed access point aP1.

(24-7) When receiving the connection completion notice from the communications control unit 606, the updating unit 607 reads the connection performance table 500.

(24-8) The updating unit 607 requests the acquiring unit 604 to acquire the cell-ID of the cell Ci to which the mobile device 101 belongs and thereby, acquires the cell-ID of the cell Ci to which the mobile device 101 belongs. In the example depicted in FIG. 24, the cell-ID "C3" of the cell C3 to which the mobile device 101 belongs is acquired.

(24-9) The updating unit 607 updates the storage contents of the connection performance table 500. In the example depicted in FIG. 24, the cell-ID "C3" of the cell C3 to which the mobile terminal device 101 belongs and the ESSID "AP1" of the access point aP1 are not registered in the respective fields of the connection performance table 500 and therefore, the cell-ID "C3", the ESSID "AP1" of the access point aP1 to which connection has been made, and the last connection time "2011.05.03.10.03" are additionally set therein. As a result, new connection performance information 500-4 is newly registered as a record into the connection performance table 500.

In this manner, according to the mobile terminal device 101, the cyclic scanning operation for an access point APj can be started in response to the screen ON. In a case where connection to an access point APj is completed before the elapse of the predetermined T from the screen ON, the storage contents of the connection performance table 500 can be updated.

Various process procedures of the mobile terminal device 101 according to the third embodiment will be described. A determination process procedure of the mobile terminal device 101 will be described in which it is determined whether connection to an access point APj in the cell Ci to which the mobile terminal device 101 belongs has been performed.

FIG. 25 is a flowchart of an example of a determining process procedure of the mobile terminal device 101 according to the third embodiment. In the flowchart depicted in FIG. 25, the detecting unit 603 determines whether the display state of the display 303 has transitioned from non-display to display (step S2501).

The detecting unit 603 waits for a transition from non-display to display in the display state of the display 303 (step S2501: NO). When the display state of the display 303 transitions from non-display to display (step S2501: YES), the determining unit 605 requests the acquiring unit 604 to acquire the cell-ID of the cell Ci to which the mobile device 101 belong and thereby, acquires the cell-ID of the cell Ci to which the mobile device 101 belongs (step S2502).

The determining unit 605 refers to the connection performance table 500 and determines whether an ESSID stored correlated with the cell-ID of the cell Ci to which the mobile device 101 belongs is registered (step S2503).

If such an ESSID is registered (step S2503: YES), the determining unit 605 sends a screen ON notice to the communications control unit 606 (step S2504), ending a series of operations according to this flowchart. At step S2504, the determining unit 605 may send to the communications control unit 606, not only the screen ON notice but also a scanning operation continuation request requesting the scanning operation to be continued.

On the other hand, if no such ESSID is registered (step S2503: NO), the determining unit 605 sends the screen ON notice and an OFF setting request (predetermined period T) to the communications control unit 606 (step S2505), ending a series of operations according to this flowchart. The OFF setting request (predetermined period T) is a request to turn the scanning operation flag OFF after the elapse of the predetermined period T.

A communication control process procedure of the mobile terminal device 101 according to the third embodiment will be described.

FIG. 26 is a flowchart of an example of the communication control process procedure of the mobile terminal device 101 according to the third embodiment. In the flowchart depicted in FIG. 26, the communications control unit 606 first determines whether a screen ON notice has been received from the determining unit 605 (step S2601).

At this time, the communications control unit 606 waits until a screen ON notice is received (step S2601: NO). When the communications control unit 606 has received a screen ON notice (step S2601: YES), the communications control unit determines whether an OFF setting request (predetermined period T) has been received from the determining unit 605 (step S2602).

If an OFF setting request (predetermined period T) has been received (step S2602: YES), the communications control unit 606 starts the scan timer (step S2603), and sets the scanning operation flag to ON (step S2604).

The communications control unit 606 determines whether the predetermined period T has elapsed since the start of the scan timer (step S2605). If the predetermined period T has not elapsed (step S2605: NO), the communications control unit 606 acquires a scan result from the second communications unit 602 (step S2606).

The communications control unit 606 then determines whether the ESSID included in the scan result is in the ESSID table 400 (step S2607). If the ESSID is not registered (step S2607: NO), the communications control unit 606 returns to step S2605.

On the other hand, if the ESSID is registered (step S2607: YES), the communications control unit 606 controls the second communications unit 602 to start a connection process to the access point APj (step S2608). The communications control unit 606 then sets the scanning operation flag to OFF (step S2609).

The communications control unit 606 saves the ESSID of the access point APj starting the connection process (step S2610) and determine whether the connection process to the access point APj has been completed (step S2611).

The communications control unit 606 waits until the completion of the connection process to the access point APj (step S2611: NO). When the connection process to the access point APj has been completed (step S2611: YES), the communications control unit 606 sends a connection completion notice to the updating unit 607 (step S2612) to end a series of operations according to this flowchart.

At step S2605, if the predetermined period T has elapsed (step S2605: YES), the communications control unit 606 sets the scanning operation flag to OFF (step S2613), and executes a stop process to stop the second communications unit 602 (step S2614), ending a series of operations according to this flowchart.

At step S2602, if the communications control unit 606 has not received an OFF setting request (predetermined period T) (step S2602: NO), the communications control unit 606 executes a scan control process (step S2615), ending a series of operations according to this flowchart. The specific process procedure of the scan control process is similar to the steps S1403 to S1413 depicted in FIG. 14 and therefore, will not again be described.

Thus, when the screen turns ON, it can be determined whether connection to an access point APj in the cell Ci to which the mobile device 101 belongs has been performed. In the case of no connection to an access point APj despite the elapse of the predetermined period T from the screen ON, the cyclic scanning operation for an access point APj can be controlled according to whether connection to an access point APj in the cell Ci to which the mobile device 101 belongs has been performed.

The update process procedure of the mobile terminal device 101 according to the third embodiment will be described.

FIG. 27 is a flowchart of an example of the update process procedure of the mobile terminal device 101 according to the third embodiment. In the flowchart depicted in FIG. 27, the updating unit 607 first determines whether a connection completion notice has been received from the communications control unit 606 (step S2701).

The updating unit 607 waits until a connection completion notice has been received from the communications control unit 606 (step S2701: NO). When the updating unit 607 has received a connection completion notice from the communications control unit 606 (step S2701: YES), the updating unit 607 requests the acquiring unit 604 to acquire the cell-ID of the cell Ci to which the mobile device 101 belongs and thereby, acquires the cell-ID of the cell Ci to which the mobile device 101 belongs (step S2702).

The updating unit 607 then requests the communications control unit 606 to acquire the ESSID of the access point APj to which connection has been made and thereby, acquires the ESSID of the access point APj to which connection has been made (step S2703). The updating unit 607 then executes a table updating process (step S2704), ending a series of operations according to this flowchart.

This enables the storage contents of the connection performance table 500 to be updated. A specific process procedure of the table updating process is similar to the specific process procedure of the table updating process depicted in FIG. 13 and therefore, will not again be described.

As described above, according to the mobile terminal device 101 of the third embodiment, it is determined at the time of the screen ON whether a connection performance to the access point APj is registered and, after the elapse of the predetermined period T, the scanning operation of the access point APj can be controlled based on the determination result.

The control method described in this embodiment can be realized by executing a previously prepared program on a personal computer or a computer such as a workstation. This control program is recorded on a non-transitory, computer-readable record medium such as a hard disk, a flexible disk, a CD-ROM, an MO, and a DVD and is executed by being read from the record medium with the computer. This control program may be distributed via a network such as the Internet.

The mobile terminal device 101 described in this embodiment can be realized further by an application specific integrated circuit (hereinafter, referred to simply as "ASIC") such as a standard cell and a structured ASIC or by a programmable logic device (PLD) such as an FPGA. For example, the above functions (the first communications unit 601 to the updating unit 607) of the mobile terminal device 101 are defined in HDL descriptions and the HDL descriptions are logically synthesized and applied to the ASIC or the PLD, whereby the mobile terminal device 101 can be manufactured.

According to one aspect of the present invention, an effect is achieved in that power consumption can be suppressed.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A mobile terminal device comprising:
    a processor that:
        connects to a base station;
        connects to a network through an access point; and
        detects a transition from a non-display state in which a screen is not displayed to a display state in which the screen is displayed; and
    a storage device that stores therein connection history information including a plurality of entries that correlate area identification information identifying a communication area of the base station, and access point identification information identifying an access point through which a connection to the network is made in the communication area, wherein
    the processor, when detecting the transition of the screen from the non-display state to the display state in a communication area of a first base station, starts searching for an access point included in the communication area of the first base station after a predetermined period elapses, and further determines whether an entry including first area identification information of the first base station is retrieved from the connection history information; and after the predetermined period elapses, performs control to connect to the network, based on a result of determination.

2. The mobile terminal device according to claim 1, wherein
    the processor, when determining after the predetermined period elapses, that the entry including the first area identification information is retrieved from the connection history information, continues searching for an access point included in the communication area of the first base station.

3. The mobile terminal device according to claim 1, wherein
    the processor, when determining after the predetermined period elapses, that the entry including the first area identification information is not retrieved from the connection history information, stops searching for an access point included in the communication area of the first base station.

4. The mobile terminal device according to claim 1, wherein
    the storage device stores therein the connection history information including the plurality of entries respectively correlating area identification information identifying a communication area of a base station, access point identification information identifying an access point through which a connection to the network is made in the communication area, and a last connection time of a connection to the network in the communication area,
    the processor, when receiving a notice of connection to an access point before the predetermined period elapses, stops searching for an access point included in the communication area of the first base station and determines whether an entry including the first area identification information of the first base station is retrieved from the connection history information, and
    the processor, when determining that the entry including the first area identification information is retrieved from the connection history information, updates the last connection time of the retrieved entry in the connection history information.

5. The mobile terminal device according to claim 1, wherein
    the processor, when receiving a notice of connection to an access point before the predetermined period elapses, stops searching for an access point included in the communication area of the first base station and determines whether an entry including the first area identification information of the first base station is retrieved from the connection history information, and
    the processor, when determining that the entry including the first area identification information is not retrieved from the connection history information, registers into the connection history information, an entry correlating the first area identification information of the first base station and access point identification information of the access point through which a connection is made.

6. The mobile terminal device according to claim 1, wherein
    the processor detects the transition of the screen from the display state to the non-display state, and
    the processor, when detecting the transition of the screen from the display state to the non-display state, stops searching for an access point included in the communication area of the first base station.

7. The mobile terminal device according to claim 1, wherein
    the processor, when detecting the transition of the screen from the non-display state to the display state in the communication area of the first base station, judges whether an access point included in the communication area of the first base station has been searched for a predetermined number of times, the processor, when judging that an access point included in the communication area of the first base station has been searched for the predetermined number of times, determines whether the entry including the first area identification information of the first base station is retrieved from the connection history information, and the processor performs control to connect to the network, based on the result of determination.

8. A control method of a mobile terminal device that includes a processor that connects to a base station and connects to a network through an access point; and a storage device that stores connection history information including a plurality of entries that correlate area identification information identifying a communication area of the base station, and access point identification information identifying an access point through which a connection to the network is made in the communication area; the control method comprising:

detecting a transition from a non-display state in which a screen is not displayed to a display state in which the screen is displayed, the detecting being by the processor of the mobile terminal device;

starting to search for an access point included in a communication area of a first base station after a predetermined period elapses, when detecting the transition of the screen from the non-display state to the display state in the communication area of the first base station, and determining whether an entry including first area identification information of the first base station is retrieved from the connection history information, the starting and the determining being by the processor of the mobile terminal device; and performing control to connect to the network, based on a result of determination, the controlling being by the processor of the mobile terminal device and performed after the predetermined period elapses.

9. A non-transitory, computer-readable recording medium storing therein a control program of a mobile terminal device that includes a processor that connects to a base station and connects to a network through an access point; and a storage device that stores connection history information including a plurality of entries that correlate area identification information identifying a communication area of the base station, and access point identification information identifying an access point through which a connection to the network is made in the communication area; the control program causing the mobile terminal device to execute a process comprising:

detecting a transition from a non-display state in which a screen is not displayed to a display state in which the screen is displayed, the detecting being by the processor of the mobile terminal device;

starting to search for an access point included in a communication area of a first base station after a predetermined period elapses, when detecting the transition of the screen from the non-display state to the display state in the communication area of the first base station, and determining whether an entry including first area identification information of the first base station is retrieved from the connection history information, the starting and the determining being by the processor of the mobile terminal device; and performing control to connect to the network, based on a result of determination, the controlling being by the processor of the mobile terminal device and performed after the predetermined period elapses.

\* \* \* \* \*